US012737778B2

(12) United States Patent
Chrapko et al.

(10) Patent No.: US 12,737,778 B2
(45) Date of Patent: Sep. 15, 2026

(54) SYSTEMS AND METHODS FOR SOCIAL GRAPH DATA ANALYTICS TO DETERMINE CONNECTIVITY WITHIN A COMMUNITY

(71) Applicant: www.TrustScience.com Inc., Edmonton (CA)

(72) Inventors: Evan V Chrapko, Edmonton (CA); Leo M. Chan, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 36 days.

(21) Appl. No.: 18/607,656

(22) Filed: Mar. 18, 2024

(65) Prior Publication Data

US 2024/0223480 A1 Jul. 4, 2024

Related U.S. Application Data

(63) Continuation of application No. 17/659,292, filed on Apr. 14, 2022, now Pat. No. 11,968,105, which is a (Continued)

(51) Int. Cl.

*H04L 43/0811* (2022.01)
*G06Q 10/40* (2026.01)
(Continued)

(52) U.S. Cl.

CPC .......... *H04L 43/0811* (2013.01); *G06Q 10/40* (2026.01); *G06Q 30/02* (2013.01); (Continued)

(58) Field of Classification Search

CPC ... H04L 43/0811; H04L 67/535; H04L 67/75; H04L 43/065; H04L 45/124; H04L 67/306; G06Q 30/02; G06Q 50/01
See application file for complete search history.

(56) References Cited

U.S. PATENT DOCUMENTS

| | | | |
|---|---|---|---|
| 5,555,542 | A | 9/1996 | Ogura et al. |
| 5,832,494 | A | 11/1998 | Egger et al. |

(Continued)

FOREIGN PATENT DOCUMENTS

| | | | |
|---|---|---|---|
| CA | 2600344 | A1 | 9/2006 |
| CA | 2775899 | A1 | 4/2011 |

(Continued)

OTHER PUBLICATIONS

H. Alani, S. Dasmahapatra, K. O'Hara and N. Shadbolt, "Identifying communities of practice through ontology network analysis," in IEEE Intelligent Systems, vol. 18, No. 2, pp. 18-25, March-Apr. 2003, doi: 10.1109/MIS.2003.1193653. (Year: 2003).*

(Continued)

*Primary Examiner* — George Chen
*Assistant Examiner* — Tayar M Kyu
(74) *Attorney, Agent, or Firm* — Amin, Turocy & Watson, LLP

(57) ABSTRACT

Systems and methods for social graph data analytics to determine the connectivity between nodes within a community are provided. A user may assign user connectivity values to other members of the community, or connectivity values may be automatically assigned from third parties or based on the frequency of interactions between members. Connectivity values may represent such factors as alignment, reputation, status, and/or influence within a social graph of a network community, or the degree of trust. The paths connecting a first node to a second node may be retrieved, and social graph data analytics may be performed on the retrieved paths. Network connectivity values and/or other social graph data may be outputted to third-party processes and services for use in initiating automatic transactions or making automated network-based or real-world decisions.

20 Claims, 10 Drawing Sheets

Related U.S. Application Data continuation of application No. 17/158,840, filed on Jan. 26, 2021, now Pat. No. 11,323,347, which is a continuation of application No. 16/166,581, filed on Oct. 22, 2018, now abandoned, which is a continuation of application No. 15/671,102, filed on Aug. 7, 2017, now Pat. No. 10,127,618, which is a continuation of application No. 15/254,642, filed on Sep. 1, 2016, now Pat. No. 9,747,650, which is a continuation of application No. 14/282,935, filed on May 20, 2014, now Pat. No. 9,460,475, which is a continuation of application No. 13/498,429, filed as application No. PCT/CA2010/001531 on Sep. 30, 2010, now Pat. No. 9,171,338.

(60) Provisional application No. 61/247,343, filed on Sep. 30, 2009.

(51) Int. Cl.
*G06Q 30/02* (2023.01)
*H04L 43/065* (2022.01)
*H04L 45/12* (2022.01)
*H04L 67/306* (2022.01)
*H04L 67/50* (2022.01)
*H04L 67/75* (2022.01)

(52) U.S. Cl.
CPC .......... *H04L 43/065* (2013.01); *H04L 45/124* (2013.01); *H04L 67/306* (2013.01); *H04L 67/535* (2022.05); *H04L 67/75* (2022.05)

(56) References Cited

U.S. PATENT DOCUMENTS 5,860,605 A 1/1999 Van Der Zanden
6,108,308 A 8/2000 Flavin et al.
6,233,571 B1 5/2001 Egger et al.
6,285,999 B1 9/2001 Page
6,286,007 B1 9/2001 Miller et al.
6,356,902 B1 3/2002 Tan et al.
6,446,048 B1 9/2002 Wells et al.
6,509,898 B2 1/2003 Chi et al.
6,633,886 B1 10/2003 Chong
6,708,308 B2 3/2004 De Souza et al.
6,738,777 B2 5/2004 Bliss et al.
6,751,729 B1 6/2004 Giniger et al.
6,823,299 B1 11/2004 Contreras
7,010,471 B2 3/2006 Rosenberg
7,069,259 B2 6/2006 Horvitz et al.
7,086,085 B1 8/2006 Brown et al.
7,130,262 B1 10/2006 Cortez et al.
7,130,908 B1 10/2006 Pecus et al.
7,139,837 B1 11/2006 Parekh et al.
7,266,649 B2 9/2007 Yoshida et al.
7,272,719 B2 9/2007 Bleckmann et al.
7,451,365 B2 11/2008 Wang et al.
7,458,049 B1 11/2008 Tuncer et al.
7,512,612 B1 3/2009 Akella et al.
7,539,697 B1 5/2009 Akella et al.
7,664,802 B2 2/2010 Aaltonen et al.
7,668,665 B2 2/2010 Kim
7,685,192 B1 3/2010 Scofield et al.
7,743,208 B2 6/2010 Yoshida et al.
7,801,971 B1 9/2010 Amidon et al.
7,805,407 B1 9/2010 Verbeke et al.
7,822,631 B1 10/2010 Vander Mey et al.
7,856,449 B1 12/2010 Martino et al.
7,865,551 B2 1/2011 Mcculler
7,886,334 B1 2/2011 Walsh
7,899,757 B1 3/2011 Talan et al.
7,930,255 B2 4/2011 Choi et al.
8,010,458 B2 8/2011 Galbreath et al.
8,010,460 B2 8/2011 Work et al.
8,010,602 B2 8/2011 Shen et al.
8,107,397 B1 1/2012 Bagchi et al.
8,108,536 B1 1/2012 Hernacki et al.
8,156,558 B2 4/2012 Goldfeder et al.
8,170,958 B1 5/2012 Gremett et al.
8,180,804 B1 5/2012 Narayanan et al.
8,214,883 B2 7/2012 Obasanjo et al.
8,234,688 B2 7/2012 Grandison et al.
8,237,714 B1 8/2012 Burke
8,244,848 B1 8/2012 Narayanan
8,261,078 B2 9/2012 Barriga et al.
8,275,866 B2 9/2012 Klincewicz
8,301,617 B2 10/2012 Muntz et al.
8,306,973 B2 11/2012 Ohazama et al.
8,316,056 B2 11/2012 Wable
8,386,301 B2 2/2013 Rajasingham
8,392,590 B2 3/2013 Bouchard et al.
8,413,261 B2 4/2013 Nemoy et al.
8,443,366 B1 5/2013 Yancey
8,468,103 B2 6/2013 Galbreath et al.
8,489,641 B1 7/2013 Seefeld et al.
8,516,196 B2 8/2013 Jain et al.
8,527,760 B2 9/2013 Faiman et al.
8,560,605 B1 10/2013 Gyongyi et al.
8,572,129 B1 10/2013 Lee et al.
8,601,025 B1 12/2013 Shajenko et al.
8,606,721 B1 12/2013 Dicker
8,621,215 B1 12/2013 Iyer
8,682,837 B2 3/2014 Skelton
8,683,423 B2 3/2014 Amaral et al.
8,688,701 B2 4/2014 Ghosh et al.
8,725,673 B2 5/2014 Kast et al.
8,768,759 B2 7/2014 Ghosh et al.
8,832,093 B2 9/2014 Redstone et al.
8,832,790 B1 9/2014 Villa et al.
8,874,572 B1 * 10/2014 Broyles .................. G06Q 10/10
706/45
8,949,250 B1 2/2015 Garg et al.
9,143,503 B2 9/2015 Lo et al.
9,147,273 B1 9/2015 Allen et al.
9,154,491 B1 10/2015 Leske
9,171,336 B2 10/2015 Englar et al.
9,171,338 B2 10/2015 Chrapko et al.
9,223,978 B2 12/2015 Kraemer
9,319,419 B2 4/2016 Sprague et al.
9,390,243 B2 7/2016 Dhillon et al.
9,438,619 B1 9/2016 Chan et al.
9,443,004 B2 9/2016 Chan
9,443,044 B2 9/2016 Gou et al.
9,460,475 B2 10/2016 Chrapko et al.
9,584,540 B1 2/2017 Chan et al.
9,613,341 B2 4/2017 Shivakumar
9,721,296 B1 8/2017 Chrapko
9,747,650 B2 8/2017 Chrapko et al.
9,785,696 B1 10/2017 Yaknenko et al.
9,846,896 B2 12/2017 Shah
10,007,895 B2 6/2018 Vanasco
10,402,457 B1 9/2019 Lawrence
10,585,893 B2 3/2020 Dantressangle et al.
10,673,880 B1 6/2020 Pratt et al.
10,732,810 B1 8/2020 Cohen et al.
10,810,093 B1 10/2020 Tucek
11,086,905 B1 8/2021 Schuck et al.
11,106,692 B1 8/2021 Guetta et al.
11,258,686 B2 2/2022 Laxman Karibhimanvar et al.
11,443,390 B1 9/2022 Caligaris et al.
2001/0034723 A1 10/2001 Subramaniam
2002/0010684 A1 1/2002 Moskowitz
2002/0065695 A1 5/2002 Francoeur et al.
2003/0046280 A1 3/2003 Rotter et al.
2003/0055894 A1 3/2003 Yeager et al.
2003/0076825 A1 4/2003 Guruprasad
2003/0133411 A1 7/2003 Ise et al.
2003/0182421 A1 9/2003 Faybishenko et al.
2003/0227924 A1 12/2003 Kodialam et al.
2004/0018518 A1 1/2004 Krieb et al.
2004/0088147 A1 5/2004 Wang et al.
2004/0122803 A1 6/2004 Dom et al.
2004/0181461 A1 9/2004 Raiyani et al.

(56) References Cited

U.S. PATENT DOCUMENTS

2004/0181518 A1 9/2004 Mayo et al.
2004/0239674 A1 12/2004 Ewald
2005/0021622 A1 1/2005 Cullen
2005/0083936 A1 4/2005 Ma
2005/0096987 A1 5/2005 Miyauchi
2005/0149522 A1 7/2005 Cookson, Jr. et al.
2005/0243736 A1 11/2005 Faloutsos et al.
2005/0256949 A1 11/2005 Gruhl et al.
2005/0286414 A1 12/2005 Young et al.
2006/0080192 A1 4/2006 Mccabe
2006/0129710 A1 6/2006 O'Connor et al.
2006/0136419 A1 6/2006 Brydon et al.
2006/0167818 A1 7/2006 Wentker et al.
2006/0212931 A1 9/2006 Shull et al.
2006/0248026 A1 11/2006 Aoyama et al.
2006/0248573 A1 11/2006 Pannu et al.
2006/0259957 A1 11/2006 Tam et al.
2006/0271564 A1 11/2006 Meng Muntz et al.
2006/0282546 A1 12/2006 Reynolds et al.
2006/0287842 A1 12/2006 Kim
2006/0290697 A1 12/2006 Madden et al.
2006/0294134 A1 12/2006 Berkhim et al.
2007/0061250 A1 3/2007 Kuo
2007/0087819 A1 4/2007 Van Luchene et al.
2007/0109302 A1 5/2007 Tsuboshita et al.
2007/0124291 A1 5/2007 Hassan et al.
2007/0136086 A1 6/2007 Luerssen
2007/0143629 A1 6/2007 Hardjono et al.
2007/0162761 A1 7/2007 Davis et al.
2007/0180495 A1 8/2007 Hardjono et al.
2007/0214249 A1 9/2007 Ahmed et al.
2007/0214259 A1 9/2007 Ahmed et al.
2007/0220146 A1 9/2007 Suzuki
2007/0263012 A1 11/2007 Panditharadhya et al.
2007/0282886 A1 12/2007 Purang et al.
2008/0005096 A1 1/2008 Moore
2008/0015916 A1 1/2008 Cossey et al.
2008/0059576 A1 3/2008 Liu et al.
2008/0086442 A1 4/2008 Dasdan et al.
2008/0101343 A1 5/2008 Monette et al.
2008/0104225 A1 5/2008 Zhang et al.
2008/0109451 A1 5/2008 Harding
2008/0133391 A1 6/2008 Kurian et al.
2008/0133552 A1 6/2008 Leary
2008/0137669 A1 6/2008 Balandina et al.
2008/0155070 A1 6/2008 El-Damhougy et al.
2008/0183378 A1 7/2008 Weidner
2008/0275899 A1* 11/2008 Baluja ................ G06Q 30/0274
707/999.102
2008/0281694 A1 11/2008 Kretz et al.
2008/0288457 A1 11/2008 Aaltonen et al.
2008/0288612 A1 11/2008 Kwon
2008/0313119 A1 12/2008 Leskovec et al.
2009/0024629 A1 1/2009 Miyauchi
2009/0027392 A1 1/2009 Jadhav et al.
2009/0043489 A1 2/2009 Weidner
2009/0049517 A1 2/2009 Sorniotti et al.
2009/0063157 A1 3/2009 Seo
2009/0064293 A1 3/2009 Li et al.
2009/0094134 A1 4/2009 Toomer
2009/0106822 A1 4/2009 Obasanjo et al.
2009/0171686 A1 7/2009 Eberstadt
2009/0198562 A1 8/2009 Wiesinger et al.
2009/0276233 A1 11/2009 Brimhall et al.
2009/0296568 A1 12/2009 Kitada
2009/0327054 A1 12/2009 Yao
2010/0004940 A1 1/2010 Choi et al.
2010/0010826 A1 1/2010 Rosenthal et al.
2010/0043055 A1 2/2010 Baumgart
2010/0076987 A1 3/2010 Schreiner
2010/0100963 A1 4/2010 Mahaffey
2010/0106557 A1 4/2010 Buss
2010/0121707 A1 5/2010 Goeldi
2010/0161369 A1* 6/2010 Farrell .................. G06Q 50/01
707/E17.044
2010/0161662 A1 6/2010 Jonas et al.
2010/0169137 A1 7/2010 Jastrebski et al.
2010/0180048 A1 7/2010 Guo et al.
2010/0185536 A1 7/2010 Rentala et al.
2010/0205541 A1 8/2010 Rapaport et al.
2010/0217525 A1 8/2010 King et al.
2010/0250605 A1 9/2010 Pamu et al.
2010/0262610 A1 10/2010 Acosta et al.
2010/0274815 A1 10/2010 Vanasco
2010/0287033 A1* 11/2010 Mathur ............... G06F 16/9535
725/44
2010/0309915 A1 12/2010 Pirbhai et al.
2010/0312644 A1 12/2010 Borgs et al.
2011/0004692 A1 1/2011 Occhino et al.
2011/0022517 A1 1/2011 Hammad
2011/0029467 A1 2/2011 Spehr et al.
2011/0055897 A1 3/2011 Arasaratnam
2011/0113098 A1 5/2011 Walsh et al.
2011/0113149 A1 5/2011 Kaal
2011/0125921 A1 5/2011 Karenos et al.
2011/0173344 A1 7/2011 Mihaly et al.
2011/0184983 A1 7/2011 Kwantes et al.
2011/0208866 A1 8/2011 Marmolejo-Meillon et al.
2011/0219034 A1 9/2011 Dekker et al.
2011/0246237 A1 10/2011 Vdovjak
2011/0246412 A1 10/2011 Skelton
2011/0264489 A1 10/2011 Ganetakos et al.
2011/0265011 A1 10/2011 Taylor et al.
2011/0282794 A1 11/2011 Hill
2011/0283205 A1 11/2011 Nie et al.
2011/0295626 A1 12/2011 Chen et al.
2011/0314557 A1 12/2011 Marshall
2012/0109714 A1 5/2012 Azar
2012/0110005 A1 5/2012 Kuo et al.
2012/0182822 A1 7/2012 Hayashi
2012/0182882 A1 7/2012 Chrapko et al.
2012/0197758 A1 8/2012 Zhong et al.
2012/0204265 A1 8/2012 Judge
2012/0278767 A1 11/2012 Stibel et al.
2012/0282884 A1 11/2012 Sun
2012/0290427 A1 11/2012 Reed et al.
2012/0317149 A1 12/2012 Jagota et al.
2012/0317200 A1 12/2012 Chan
2012/0324027 A1 12/2012 Vaynblat et al.
2013/0013807 A1 1/2013 Chrapko et al.
2013/0054598 A1 2/2013 Caceres
2013/0073387 A1 3/2013 Heath
2013/0097180 A1 4/2013 Tseng
2013/0097184 A1 4/2013 Berkhim et al.
2013/0110732 A1 5/2013 Uppal
2013/0124542 A1 5/2013 Lee et al.
2013/0138741 A1 5/2013 Redstone et al.
2013/0166601 A1 6/2013 Chrapko et al.
2013/0173457 A1 7/2013 Chrapko et al.
2013/0198811 A1 8/2013 Yu et al.
2013/0227558 A1 8/2013 Du et al.
2013/0254305 A1 9/2013 Cheng et al.
2013/0282884 A1 10/2013 Chandrasekaran et al.
2013/0290226 A1 10/2013 Dokken
2013/0291098 A1 10/2013 Chung et al.
2013/0317941 A1 11/2013 Stoll et al.
2013/0332740 A1 12/2013 Sauve et al.
2014/0081652 A1 3/2014 Klindworth
2014/0089189 A1 3/2014 Vasireddy
2014/0114962 A1 4/2014 Rosenburg et al.
2014/0156274 A1 6/2014 You et al.
2014/0172708 A1 6/2014 Chrapko et al.
2014/0173723 A1 6/2014 Singla et al.
2014/0185430 A1 7/2014 Li et al.
2014/0258160 A1 9/2014 Chrapko et al.
2014/0258305 A1 9/2014 Kapadia et al.
2014/0278730 A1 9/2014 Muhart et al.
2014/0279352 A1 9/2014 Schaefer et al.
2014/0280151 A1 9/2014 Micaelian
2014/0287725 A1 9/2014 Lee
2014/0289261 A1 9/2014 Shivakumar
2014/0304339 A1 10/2014 Hamilton
2014/0317003 A1 10/2014 Shah
2014/0317107 A1 10/2014 Gharpure et al.

(56) References Cited

U.S. PATENT DOCUMENTS

| | | | |
|---|---|---|---|
| 2015/0019565 | A1 | 1/2015 | Lijachev et al. |
| 2015/0026120 | A1 | 1/2015 | Chrapko et al. |
| 2015/0089568 | A1 | 3/2015 | Sprague et al. |
| 2015/0121456 | A1 | 4/2015 | Milman et al. |
| 2015/0142595 | A1 | 5/2015 | Acuña-Rohter |
| 2015/0163217 | A1 | 6/2015 | Lo et al. |
| 2015/0169142 | A1 | 6/2015 | Longo et al. |
| 2015/0213407 | A1 | 7/2015 | Cabler et al. |
| 2015/0220835 | A1 | 8/2015 | Wilson et al. |
| 2015/0242856 | A1 | 8/2015 | Dhurandhar et al. |
| 2015/0271206 | A1 | 9/2015 | Schultz et al. |
| 2015/0347591 | A1 | 12/2015 | Bax et al. |
| 2015/0359039 | A1 | 12/2015 | Haque et al. |
| 2015/0370801 | A1 | 12/2015 | Shah |
| 2016/0004741 | A1 | 1/2016 | Johnson et al. |
| 2016/0035046 | A1 | 2/2016 | Gupta et al. |
| 2016/0073271 | A1 | 3/2016 | Schultz et al. |
| 2016/0171011 | A1 | 6/2016 | Drogobetski et al. |
| 2016/0171113 | A1 | 6/2016 | Fanous et al. |
| 2016/0180840 | A1 | 6/2016 | Siddiq et al. |
| 2016/0197788 | A1 | 7/2016 | Chrapko et al. |
| 2016/0253679 | A1 | 9/2016 | Venkatraman et al. |
| 2016/0277424 | A1 | 9/2016 | Mawji et al. |
| 2017/0024749 | A1 | 1/2017 | Barathy et al. |
| 2017/0083820 | A1 | 3/2017 | Huang et al. |
| 2017/0236078 | A1 | 8/2017 | Rasumov |
| 2017/0293696 | A1 | 10/2017 | Bendersky et al. |
| 2018/0068010 | A1 | 3/2018 | Paterson et al. |
| 2019/0165941 | A1 | 5/2019 | Ray et al. |
| 2019/0385130 | A1 | 12/2019 | Mossoba et al. |
| 2020/0311734 | A1 | 10/2020 | Mardikar et al. |
| 2022/0222387 | A1 | 7/2022 | Conti |

FOREIGN PATENT DOCUMENTS

| | | | |
|---|---|---|---|
| CN | 1619567 | A | 5/2005 |
| CN | 101167093 | A | 4/2008 |
| CN | 101383695 | A | 3/2009 |
| CN | 101393566 | A | 3/2009 |
| CN | 101403978 | A | 4/2009 |
| CN | 101438279 | A | 5/2009 |
| CN | 101443806 | A | 5/2009 |
| CN | 101841539 | A | 9/2010 |
| CN | 101902459 | A | 12/2010 |
| CN | 102136114 | A | 7/2011 |
| CN | 102668457 | A | 9/2012 |
| CN | 102685661 | A | 9/2012 |
| CN | 102855572 | A | 1/2013 |
| CN | 103095728 | A | 5/2013 |
| CN | 103456233 | A | 12/2013 |
| CN | 103493049 | A | 1/2014 |
| CN | 103593764 | A | 2/2014 |
| CN | 104504043 | A | 4/2015 |
| CN | 102823225 | B | 9/2015 |
| CN | 104915391 | A | 9/2015 |
| CN | 104954492 | A | 9/2015 |
| CN | 109690608 | A | 4/2019 |
| EP | 1511232 | A1 | 3/2005 |
| JP | 2001-298453 | A | 10/2001 |
| JP | 2002/123649 | A | 4/2002 |
| JP | 2003-259070 | A | 9/2003 |
| JP | 2005/149202 | A | 6/2005 |
| JP | 2005339281 | A | 12/2005 |
| JP | 2006-113900 | A | 4/2006 |
| JP | 2006-260099 | A | 9/2006 |
| JP | 2007-004411 | A | 1/2007 |
| JP | 2007-249413 | A | 9/2007 |
| JP | 2008-129990 | A | 6/2008 |
| JP | 2009-025871 | A | 2/2009 |
| JP | 2009-064433 | A | 3/2009 |
| JP | 2009-146253 | A | 7/2009 |
| JP | 2013/506204 | A | 2/2013 |
| KR | 10-2014-0070065 | A | 6/2014 |
| KR | 2019860 | B1 | 9/2019 |
| TW | 201250611 | A | 12/2012 |
| WO | 2006/019752 | A1 | 2/2006 |
| WO | 2006/115919 | A2 | 11/2006 |
| WO | 2007/085903 | A2 | 8/2007 |
| WO | 2009/002193 | A1 | 12/2008 |
| WO | 2009/020964 | A2 | 2/2009 |
| WO | 2009/109009 | A1 | 9/2009 |
| WO | 2010/048172 | A1 | 4/2010 |
| WO | 2011/106897 | A1 | 9/2011 |
| WO | 2011/134086 | A1 | 11/2011 |
| WO | 2011/143761 | A1 | 11/2011 |
| WO | 2011/127206 | A3 | 4/2012 |
| WO | 2013/026095 | A1 | 2/2013 |
| WO | 2013/173790 | A1 | 11/2013 |
| WO | 2014/144114 | A1 | 9/2014 |
| WO | 2015/047992 | A2 | 4/2015 |
| WO | 2015/106657 | A1 | 7/2015 |
| WO | 2016/011371 | A1 | 1/2016 |
| WO | 2017/019203 | A1 | 2/2017 |

OTHER PUBLICATIONS

Office Action received for Mexican Patent Application Serial No. MX/a/2019/001858 dated Oct. 9, 2023, 14 pages (including English translation).

Final Office Action received for U.S. Appl. No. 17/079,600 dated Dec. 5, 2023, 47 pages.

Notice of Allowance received for U.S. Appl. No. 17/659,292 dated Dec. 18, 2023, 95 pages.

Final Office Action received for U.S. Appl. No. 18/046,382 dated Dec. 26, 2023, 127 pages.

Notice of Allowance received for Chinese Patent Application Serial No. 201780024074.0 dated Dec. 8, 2023, 8 pages (including English translation).

Final Office Action received for U.S. Appl. No. 16/745,498 dated Jan. 12, 2024, 36 pages.

Notice of Allowance received for U.S. Appl. No. 17/659,292 dated Jan. 19, 2024, 6 pages.

Notice of Allowance received for U.S. Appl. No. 18/310,590 dated Jan. 29, 2024, 48 pages.

Notice of Allowance received for U.S. Appl. No. 16/534,474 dated Oct. 17, 2023, 11 pages.

Notice of Allowance received for U.S. Appl. No. 16/534,474 dated Oct. 18, 2023, 10 pages.

Notice of Allowance received for U.S. Appl. No. 16/534,474 dated Nov. 14, 2023, 7 pages.

Notice of Allowance received for U.S. Appl. No. 16/534,474 dated Jan. 10, 2024, 7 pages.

Non Final Office Action received for U.S. Appl. No. 18/357,229 dated Jan. 24, 2024, 90 pages.

Notice of Allowance received for U.S. Appl. No. 17/660,167 dated Feb. 23, 2024, 67 pages.

Office Action received for Brazilian Patent Application Serial No. BR112019002958-3 dated Jan. 26, 2024, 5 pages (including English translation).

Final Office Action received for U.S. Appl. No. 17/805,750 dated Mar. 7, 2024, 51 pages.

Notice of Allowance received for U.S. Appl. No. 17/659,292 dated Mar. 22, 2024, 16 pages.

Notice of Allowance received for U.S. Appl. No. 18/310,590 dated Mar. 13, 2024, 7 pages.

Notice of Allowance received for U.S. Patent Application Serial No. 17/660, 167 dated Mar. 22, 2024, 7 pages.

Dean et al., “Mapreduce: Simplified Data Processing on Large Clusters”, Communications of the ACM, vol. 51, No. 1, Jan. 2008, pp. 107-113.

Office Action received for Mexican Patent Application Serial No. MX/a/2019/001858 dated Mar. 6, 2024, 10 pages.

Notice of Allowance received for U.S. Appl. No. 16/745,498 dated Mar. 28, 2025, 44 pages.

Notice of Allowance received for U.S. Appl. No. 17/805,750 dated Feb. 26, 2025, 48 pages.

Notice of Allowance received for U.S. Appl. No. 18/398,899 dated Mar. 13, 2025, 50 pages.

(56) References Cited

OTHER PUBLICATIONS

Notice of Allowance received for U.S. Appl. No. 18/748,766 dated Mar. 17, 2025, 185 pages.
Notice of Allowance received for U.S. Appl. No. 18/649,423, dated Oct. 17, 2024, 149 pages.
Non-Final Office Action received for U.S. Appl. No. 16/745,498, dated Sep. 9, 2024, 29 pages.
Non-Final Office Action received for U.S. Appl. No. 17/805,750, dated Sep. 6, 2024, 38 pages.
Final Office Action received for U.S. Appl. No. 18/187,040, dated Jul. 25, 2024, 63 pages.
Final Office Action received for U.S. Appl. No. 18/357,229, dated Oct. 17, 2024, 50 pages.
Zeng et al., "Trust Path-Searching Algorithm Based on PSO", The 9th International Conference for Young Computer Scientists, IEEE, 2008, pp. 1975-1979.
Non-Final Office Action received for U.S. Appl. No. 18/398,899, dated Aug. 29, 2024, 109 pages.
Office Action received for Canada Patent Application Serial No. 3185523 dated Aug. 2, 2024, 5 pages.
Tang, et al. Social influence analysis in large-scale networks. p. 807. Proceedings of the ACM SIGKDD International Conference on Knowledge Discovery and Data Mining ; KDD '09: Proceedings of the 15th ACM SIGKDD International Conference on Knowledge Discovery and Data Mining (15th ACM SIGKDD International Conference on Knowledge Discovery and Data Mining, KDD '09—Jun. 28, 2009 to Jul. 1, 2009—Paris), Jan. 1, 2009; Jun. 28, 2009-Jul. 1, 2009 ACM, 2 Penn Plaza, Suite 701 New York NY 10121-0701 USA.
Non-Final Office Action received for U.S. Appl. No. 13/521,216, dated Jun. 20, 2014, 20 pages.
Final Office Action received for U.S. Appl. No. 13/521,216, dated May 21, 2015, 28 pages.
Non-Final Office Action received for U.S. Appl. No. 13/521,216, dated Apr. 13, 2016, 30 pages.
Final Office Action received for U.S. Appl. No. 13/521,216, dated Oct. 21, 2016, 36 pages.
Final Office Action received for U.S. Appl. No. 13/503,352, dated Jan. 5, 2015, 28 pages.
Non-Final Office Action received for U.S. Appl. No. 13/503,352, dated Aug. 21, 2014 24 pages.
Non-Final Office Action received for U.S. Appl. No. 13/503,352, dated Aug. 18, 2015, 26 pages.
Non-Final Office Action received for U.S. Appl. No. 15/224,063, dated Sep. 1, 2016, 47 pages.
Non-Final Office Action received for U.S. Appl. No. 13/695,419, dated Oct. 31, 2014, 20 pages.
Final Office Action received for U.S. Appl. No. 13/695,419, dated Jun. 2, 2015, 31 pages.
Non-Final Office Action received for U.S. Appl. No. 13/695,419, dated Dec. 17, 2015, 43 pages.
Non-Final Office Action received for U.S. Appl. No. 13/695,419, dated Apr. 5, 2016, 72 pages.
Non-Final Office Action received for U.S. Appl. No. 13/695,419, dated Oct. 12, 2016, 147 pages.
Non-Final Office Action received for U.S. Appl. No. 13/824,324, dated Mar. 9, 2017, 17 pages.
Non-Final Office Action received for U.S. Appl. No. 14/664,285, dated Jun. 4, 2015, 25 pages.
Final Office Action received for U.S. Appl. No. 14/664,285, dated Sep. 21, 2015, 33 pages.
Non-Final Office Action received for U.S. Appl. No. 14/664,285, dated Mar. 4, 2016, 24 pages.
Final Office Action received for U.S. Appl. No. 14/664,285, dated Jul. 29, 2016, 29 pages.
Non-Final Office Action received for U.S. Appl. No. 15/070,643, dated Aug. 26, 2016, 36 pages.
Non-Final Office Action received for U.S. Appl. No. 15/589,841, dated Jun. 5, 2017, 40 pages.
International Search Report and Written Opinion received for PCT Application No. PCT/CA2017/050257, dated May 19, 2017, 8 pages.
International Search Report and Written Opinion received for PCT Application No. PCT/CA2017/050197, fated May 30, 2017, 15 pages.
Non- Final Office Action received for U.S. Appl. No. 15/466,590, dated Jul. 13, 2017, 20 pages.
Non- Final Office Action received for U.S. Appl. No. 15/055,952, dated Aug. 12, 2016, 33 pages.
International Search Report and Written Opinion for received for PCT Application No. PCT/CA2017/050255, dated Jun. 19, 2017, 9 pages.
Non-Final Office Action received for U.S. Appl. No. 13/695,419, dated Jun. 14, 2017, 44 pages.
Notice of Reasons for Refusal received for Japanese Patent Application No. 2016-131310, dated Aug. 2, 2017, 4 pages (Including English Translation).
Non-Final Office Action received for U.S. Appl. No. 15/224,063, dated Jul. 14, 2017, 36 pages.
Non-Final Office Action received for U.S. Appl. No. 15/400,471, dated Aug. 7, 2017, 24 pages.
Non-Final Office Action received for U.S. Appl. No. 15/630,299, dated Aug. 10, 2017, 17 pages.
International Search Report and Written Opinion received for PCT Application No. PCT/CA2017/050351 dated Jun. 19, 2017, 10 pages.
Non-Final Office Action received for U.S. Appl. No. 15/671,102 dated Sep. 22, 2017, 21 pages.
Non-Final Office Action received for U.S. Appl. No. 15/675,041 dated Oct. 6, 2017, 72 pages.
Office Action received for Canadian Patent Application Serial No. 2,775,899 dated Oct. 12, 2017, 6 pages (Including English Translation).
Notice of Allowance received for U.S. Appl. No. 13/695,419 dated Nov. 8, 2017, 92 pages.
Final Office Action received for U.S. Appl. No. 13/824,324, dated Nov. 30, 2017, 33 pages.
Decision to Grant received for Japanese Patent Application No. 2016-131310, dated Nov. 14, 2017, 6 pages (Including English Translation).
International Search Report and Written Opinion received for PCT Application No. PCT/CA2010/001531, dated Jan. 10, 2011, 9 pages.
Notification of Reasons for Refusal received for Japanese Patent Application No. 2015-085003, Mar. 29, 2016, 4 pages(Including English Translation).
Decision to Grant a Patent received for Japanese Patent Application No. 2015-085003, dated Jun. 2, 2016 6 pages (Including English Translation).
Notification of Reasons for Refusal received for Japanese Patent Application No. 2012-531192, Apr. 3, 2014, 7 pages(Including English Translation).
Decision to Grant a Patent received for Japanese Patent Application No. 2012-531192, dated Feb. 16, 2015, 6 pages(Including English Translation).
Extended European Search Report received for European Patent Application No. 10819770.8 dated Oct. 9, 2014, 7 pages.
Communication pursuant to Rules 70(2) received for European Patent Application No. 10819770.8 dated Oct. 28, 2014, 1 page.
Communication pursuant to Article 94(3) EPC for European Patent Application No. 10819770.8 dated Feb. 8, 2016, 7 pages.
Decision to Refuse European Patent Application No. 10819770.8 dated Apr. 18, 2017, 6 pages.
First Office Action received for Chinese Application Serial No. 201080051338.X, dated Mar. 24, 2014 for 31 pages (Including English Translation).
Second Office Action received for Chinese Application Serial No. 201080051338.X, dated Jan. 16, 2015, 26 pages (Including English Translation).
Office Action received for Chinese Application Serial No. 201080051338.X, dated Sep. 28, 2015, 12 pages (Including English Translation).

(56) References Cited

OTHER PUBLICATIONS

Office Action received for Mexican Patent Application Serial No. MX/a/2019/001858 dated Sep. 3, 2024, 20 pages.
Notification to Grant Patent Right for Invention received for Chinese Application Serial No. 201080051338.X, dated Mar. 22, 2016, 4 pages (Including English Translation).
International Search Report and Written Opinion received for International Patent Application No. PCT/CA2011/050017 dated Apr. 13, 2011, 9 pages.
International Search Report and Written Opinion received for International Patent Application No. PCT/CA2010/001658 dated Jan. 26, 2011, 9 pages.
International Search Report and Written Opinion received for International Patent Application No. PCT/CA2011/050260 dated Jul. 26, 2011, 7 pages.
Final Office Action received for U.S. Appl. No. 15/224,063, dated Dec. 15, 2017, 52 pages.
Non-Final Office Action received for U.S. Appl. No. 15/589,841, dated Dec. 15, 2017, 66 pages.
Final Office Action received for U.S. Appl. No. 15/466,590, dated Jan. 19, 2018, 56 pages.
Final Office Action received for U.S. Appl. No. 15/400,471, dated Jan. 26, 2018, 78 pages.
Final Office Action received for U.S. Appl. No. 15/630,299, dated Feb. 8, 2018, 40 pages.
International Search Report and Written Opinion received for International Patent Application No. PCT/CA2017/050962 dated Nov. 20, 2017, 9 pages.
Non-Final Office Action received for U.S. Appl. No. 15/644,356, dated Apr. 5, 2018, 74 pages.
Notice of Allowance received for U.S. Appl. No. 15/589,841, dated Mar. 20, 2018, 44 pages.
Non-Final Office Action received for U.S. Appl. No. 15/046,041, dated Apr. 26, 2018, 70 pages.
Non-Final Office Action received for U.S. Appl. No. 15/907,164, dated May 24, 2018, 29 pages.
Final Office Action received for U.S. Appl. No. 15/675,041 dated May 17, 2018, 73 pages.
Non-Final Office Action received for U.S. Appl. No. 15/400,471, dated May 29, 2018, 34 pages.
Non-Final Office Action received for U.S. Appl. No. 15/630,299, dated May 17, 2018, 19 pages.
Notice of Allowance received for U.S. Appl. No. 15/953,011 dated Aug. 28, 2018, 72 pages.
First Action Interview Pilot Program Pre-Interview Communication received for U.S. Appl. No. 15/953,011 dated Jul. 10, 2018, 10 pages.
First Action Interview Pilot Program Pre-Interview Communication for U.S. Appl. No. 15/907,166 dated Jul. 6, 2018, 6 pages.
Final Office Action received for U.S. Appl. No. 15/400,471 dated Oct. 29, 2018, 42 pages.
Final Office Action received for U.S. Appl. No. 15/644,356 dated Oct. 18, 2018, 41 pages.
Non-Final Office Action received for U.S. Appl. No. 16/014,032 dated Oct. 4, 2018, 74 pages.
First Action Interview Pilot Program Communication for U.S. Appl. No. 15/907,166 dated Oct. 31, 2018, 46 pages.
Final Office Action received for U.S. Appl. No. 15/907,164 dated Nov. 14, 2018, 70 pages.
First Office Action received for Chinese Application Serial No. 201610392926.9, dated Sep. 4, 2018, 17 pages.
Final Office Action received for U.S. Appl. No. 15/046,041 dated Nov. 20, 2018, 32 pages.
Non-Final Office Action received for U.S. Appl. No. 16/141,615 dated Nov. 29, 2018, 15 pages.
www.trustscience.com Inc., et al., "Defendants' Motion for Stay of Discovery Pending Decision on Motion to Dismiss," Case 6:18-cv-01174-CEM-DCI, Document 32, Filed Sep. 21, 2018, 12 pages.
www.trustscience.com Inc., et al., "Plaintiff's Response in Opposition to Defendants' Motion to Stay Discovery Pending Decision on Motion to Dismiss," Case 6:18-cv-01174-CEM-DCI, Document 35, Filed Oct. 5, 2018, 20 pages.
www.trustscience.com Inc., et al., "Motion to Dismiss the Complaint and Memorandum of Law in Support," Case 6:18-cv-01174-CEM-DCI, Document 41, Filed Oct. 19, 2018, 36 pages.
www.trustscience.com Inc., et al., "Plaintiff's Response to Defendants' Motion to Dismiss and Notice of Intent to File Amended Complaint," Case 6:18-cv-01174-CEM-DCI, Document 44, Filed Nov. 2, 2018, 3 pages.
www.trustscience.com Inc., et al., "First Amended Complaint and Demand for Injunctive Relief and Jury Trial," Case 6:18-cv-01174-CEM-DCI, Document 46 Filed Nov. 6, 2018, 49 pages.
www.trustscience.com Inc., et al., "Order and Permanent Injunction," Case 6:18-cv-01174-CEM-DCI, Document 49 Filed Nov. 21, 2018, 4 pages.
Examiner's Report received for Canadian Application Serial No. 2,775,899 dated Oct. 2, 2018, 8 pages.
Non-Final Office Action recevied for U.S. Appl. No. 15/675,041 dated Jan. 11, 2019, 91 pages.
Non-Final Office Action for U.S. Appl. No. 16/204,651 dated Jan. 29, 2019, 47 pages.
Notice of Allowance for U.S. Appl. No. 16/195,946 dated Feb. 14, 2019, 69 pages.
Notice of Allowance for U.S. Appl. No. 15/400,471 dated Mar. 21, 2019, 47 pages.
Non-Final office Action recevied for U.S. Appl. No. 15/644,356 dated Mar. 21, 2019, 39 pages.
First Office Action received for Chinese Patent Application Serial No. 201610392929.2 dated Mar. 14, 2019, 20 pages.
Final Office Action received for U.S. Appl. No. 15/907,166 dated Apr. 24, 2019, 27 pages.
Final Office Action received for U.S. Appl. No. 16/014,032 dated Apr. 17, 2019, 38 pages.
International Search Report and Written Opinion received for International Patent Application No. PCT/CA2011/050569 mailed on Dec. 5, 2011, 9 pages.
Non-Final Office Action received for U.S. Appl. No. 15/046,041 dated May 22, 2019, 37 pages.
Final Office Action received for U.S. Appl. No. 16/204,651 dated Jul. 19, 2019, 34 pages.
Final Office Action received for U.S. Appl. No. 16/141,615 dated Jul. 30, 2019, 78 pages.
Final Office Action received for U.S. Appl. No. 15/675,041 dated Jul. 29, 2019, 61 pages.
Non-Final Office Action received for U.S. Appl. No. 15/907,164 dated Aug. 20, 2019, 52 pages.
Non-Final Office Action received for U.S. Appl. No. 16/166,581 dated Sep. 18, 2019, 92 pages.
Non-Final Office Action received for U.S. Appl. No. 16/534,474 dated Jan. 19, 2022, 44 pages.
Office Action received for Mexican Patent Application Serial No. MX/a/2018/010423 dated Nov. 25, 2021, 11 pages.
Office Action received for Mexican Patent Application Serial No. MX/a/2018/010005 dated Nov. 30, 2021, 9 pages.
Decision to Grant Patent received for Japanese Patent Application No. 2019-500705 dated Feb. 15, 2022, 5 pages(Including English Translation).
Final Office Action received for U.S. Appl. No. 16/774,744 dated Apr. 14, 2022, 86 pages.
Final Office Action received for U.S. Appl. No. 16/745,498 dated Apr. 19, 2022, 54 pages.
Office Action received for Canadian Patent Application Serial No. 3014361 dated Mar. 16, 2022, 4 pages.
Final Office Action received for U.S. Appl. No. 16/773,382 dated May 24, 2022, 40 pages.
Non Final Office Action received for U.S. Appl. No. 17/231,658 dated Jun. 16, 2022, 129 pages.
Non Final Office Action received for U.S. Appl. No. 16/995,293 dated Jul. 6, 2022, 123 pages.
Summons to attend oral proceedings received for European Patent Application Serial No. 17840662.5 dated May 23, 2022, 11 pages.

(56) References Cited

OTHER PUBLICATIONS

Office Action received for Mexican Patent Application Serial No. MX/a/2018/010005 dated May 17, 2022, 12 pages.
Notice of Allowance received for Mexican Patent Application No. MX/a/2018/010423, dated May 19, 2022 2 pages.
Office Action received for Mexican Patent Application Serial No. MX/a/2018/011618 dated May 27, 2022 for, 7 pages.
Final Office Action received for U.S. Appl. No. 17/079,600 dated Aug. 25, 2022, 36 pages.
Final Office Action received for U.S. Appl. No. 16/534,474 dated Aug. 24, 2022, 117 pages.
Office Action received for Mexican Patent Application Serial No. MX/a/2018/010426 dated Jul. 12, 2022, 7 pages (Including English Translation).
Notice of Allowance received for Canadian Patent Application No. 3014995 dated Sep. 6, 2022, 1 page.
Non-Final Office Action received for U.S. Appl. No. 16/745,498 dated Nov. 29, 2022, 44 pages.
Decision to refuse European received for European Patent Application Serial No. 17840662.5 dated Nov. 18, 2022, 14 pages.
First Office Action received for Chinese Patent Application Serial No. 201780025677.2 dated Oct. 13, 2022, 12 pages.(Including English Translation).
Shang Jiang et al., "Application of incidence matrix method in credit evaluation", Journal of Shenyang Normal University (Natural Science), Jul. 15, 2007, pp. 308-310.
Shen Limin et al., "Adaptive trust model based on time series analysis in opportunistic network", Journal of Chinese Computer Systems No. 7, Jul. 15, 2015, pp. 1553-1558.
First Office Action received for Chinese Patent Application Serial No. 201780024074.0 dated Oct. 10, 2022, 20 pages.(Including English Translation).
First Office Action received for Chinese Patent Application Serial No. 201780030761.3 dated Nov. 21, 2022, 22 pages.(Including English Translation).
First Office Action received for Mexican Patent Application Serial No. MX/a/2019/001858 dated Nov. 24, 2022, 8 pages.(Including English Translation).
Notice of Allowance received for U.S. Appl. No. 16/773,382 dated Dec. 21, 2022, 43 pages.
Notice of Allowance received for U.S. Appl. No. 16/995,293 dated Jan. 24, 2023, 73 pages.
Non-Final Office Action received for U.S. Appl. No. 18/046,382 dated Mar. 16, 2023, 139 pages.
Non-Final Office Action received for U.S. Appl. No. 16/534,474 dated Mar. 16, 2023, 49 pages.
Non-Final Office Action received for U.S. Appl. No. 17/659,292 dated Mar. 28, 2023, 124 pages.
Non-Final Office Action received for U.S. Appl. No. 17/079,600 dated Apr. 7, 2023, 30 pages.
Notice of Allowance received for U.S. Appl. No. 16/995,293 dated Mar. 1, 2023, 7 pages.
Office Action received for Mexican Patent Application Serial No. MX/a/2018/011618 dated Jan. 27, 2023, 16 pages (with machine translation).
Notice of Allowance received for Canadian Patent Application No. 3016091 dated Mar. 2, 2023, 1 page.
Office Action received for Chinese Patent Application Serial No. 201780025677.2 dated Mar. 10, 2023, 2 pages (Original Copy only).
Final Office Action received for U.S. Appl. No. 17/231,658 dated May 10, 2023, 97 pages.
Non-Final Office Action received for U.S. Appl. No. 17/805,750 dated Jun. 2, 2023, 124 pages.
Office Action received for Chinese Patent Application Serial No. 201780024074.0 dated Apr. 11, 2023, 22 pages.
Notice of Allowance received for Canadian Patent Application Serial No. 3014361 dated Apr. 27, 2023, 1 page.
Office Action received for Mexican Patent Application Serial No. MX/a/2019/001858 dated Apr. 21, 2023, 12 pages (including machine translation).
Notice of Allowance received for Taiwanese Patent Application Serial No. 106127464 dated May 25, 2023, 3 pages (including English translation).
Notice of Allowance received for Chinese Patent Application Serial No. 201780030761.3 dated Jul. 10, 2023, 12 pages (including English machine translation).
Li, Han "Research on Trust Recommendation and Friend Search Filtering Algorithm in Social Networks" Yanshan University, 2012, 160 pages (including English Translation).
Non-Final Office Action received for U.S. Appl. No. 16/745,498 dated Aug. 25, 2023, 51 pages.
Non-Final Office Action received for U.S. Appl. No. 17/660,167 dated Sep. 21, 2023, 131 pages.
Non-Final Office Action received for U.S. Appl. No. 18/187,040 dated Sep. 29, 2023, 57 pages.
Notice of Allowance received for U.S. Appl. No. 16/534,474 dated Oct. 3, 2023, 39 pages.
Notice of Allowance received for Mexican Patent Application Serial No. MX/a/2018/011618, dated Aug. 8, 2023, 3 pages (English Translation).
Non-Final Office Action received for U.S. Appl. No. 18/310,590 dated Oct. 11, 2023, 94 pages.
Angwin et al., "Scrapers' Dig Deep for Data on Web", http://online.wsj.com/article/SB10001424052748703358504575544381288117888.html?, Oct. 12, 2010, printed on Nov. 6, 2010, 5 pages.
Anthes, "The Search is on-Computerworld", http://www.computerworld.com/s/article/70041|The_Search_Is_On, Apr. 15, 2002, printed Nov. 6, 2010, 8 pages.
Baras et al., "Dynamic Self-Organization and Clustering in Distributed Networked Systems for Performance Improvement," Proceedings of the 47th annual Allerton conference on Communication, Control, and Computing, Alierton'09, Illinois, USA, pp. 968-975, Sep. 30-Oct. 2, 2009.
Chakraborty et al., "TrustBAC-Integrating Trust Relationships into the RBAC Model for Access Control in Open Systems," Proceedings of the eleventh ACM symposium on Access Control Models and Technologies, SACMAT '06, 10 pages, Jun. 7-9, 2006.
Ding et al., "Transitive Closure and Metric Inequality of Weighted Graphs: Detecting Protein Interaction Modules Using Cliques", Int. J. Data Mining and Bioinformatics, vol. X, No. X, 200X, pp. 162-177, 2006.
"Facebook announces groups, downloading", http://content.usatoday.com/communities/technologylive/post/2010/10/live-facebook-announcesdownloading-other-features/1, Oct. 6, 2010, printed Nov. 6, 2010, 7 pages.
Feldman et al., "Robust Incentive Techniques for Peer-to-Peer Networks", Proceedings of the fifth ACM Conference on Electronic Commerce EC'04, New York, New York, USA, 10 pages, May 17-20, 2004.
Final Office Action received for U.S. Appl. No. 15/079,952, dated Dec. 16, 2016, 14 pages.
Gan et al., "A Novel Reputation Computing Model for Mobile Agent-Based E-Commerce Systems", Proceedings of the International Conference on Information Security and Assurance, ISA 2008, pp. 253-260, Apr. 24-26, 2008.
Geisberger, et al., "Contraction Hierarchies: Faster and Simpler Hierarchical Routing in Road Networks", LNCS 5038, 2008, pp. 319-333.
Golbeck et al., "Inferring Trust Relationships in Web-based Social Networks", Journal of ACM Transactions of Internet Technology (TOIT), vol. 6, issue 4, Nov. 2006, 41 pages.
Gu et al., "Processing Massive Sized Graphs Using Sector/Sphere", Proceedings of the 2010 IEEE Workshop on Many-Task Computing on Grids and Supercomputers (MTAGS), New Orleans, LA, USA, 10 pages, Nov. 15, 2010.
Gupta et al., "A Reputation System for Peer-to-Peer Networks," Proceedings of the 13th International Workshop on Network and operating systems support for digital audio and video NOSSDAV'03, Monterey, California, USA, Jun. 1-3, 2003.

(56) References Cited

OTHER PUBLICATIONS

Gupta et al., "Reputation Management Framework and its use as Currency in large-Scale Peer to-Peer Networks", Proceedings of the Fourth IEEE International Conference on Peer-to-Peer Computing P2P2004, Zurich, Switzerland, pp. 1-9, Aug. 2004.
Hartley et al., "MSSG: A Framework for Massive-Scale Semantic Graphs," Proceedings of 2006 IEEE International Conference on Cluster Computing, CLUSTER'2006, Barcelona, Spain, 10 pages, Sep. 25-28, 2006.
Huynh et al., "An Integrated Trust and reputation model for open multi-Agent systems," Journal of Autonomous Agents and Multi-Agent Systems, vol. 13, issue 2, pp. 119-154, Sep. 2006.
International Search Report and Written Opinion for International Patent Application No. PCT/CA2016/050305 mailed Jun. 3, 2016, 7 pages.
Josang et al., "Simplification and Analysis of Transitive Trust Networks", Journal of Web Intelligence and Agent Systems, vol. 4, Issue 2, Apr. 2006, pp. 1-26.
Kamola et al., "Reconstruction of a Social Network Graph from Incomplete Call Detail Records", Conference Proceedings of the International Conference on Computational Aspects of SocialNetworks (CASoN), Oct. 19, 2011, pp. 136-140.
Kang et al., "PEGASUS: A Peta-Scale Graph Mining System—Implementation and Observations", Proceedings of the Ninth IEEE International Conference on Data Mining, ICDM'09, Miami, FL, USA, pp. 229-238, Dec. 6-9, 2009.
Kim et al., "Design and Implementation of the location-based Personalized Social Media Service," Conference Proceedings of the International Conference on Internet and Web Applications and Services (ICIW), May 9, 2010, pp. 116-121.
Lumsdaine et al., "Challenges in Parallel Graph Processing", Parallel Processing letters, vol. 17, No. 1, Mar. 2007,16 pages.
Malewicz et al., "Pregel: a System for large-Scale Graph Processing", Proceedings of the 2010 International Conference on Management Data, SIGMOD'10, Indianapolis, Indiana, USA, Jun. 6-11, 2010, pp. 135-145.
Meyer "Outrage as Credit Agency Plans to Mine Facebook Data," Gigaom.com, https://gigaom.com/2012/06/07/credit-agency-mines-facebook-data/ Jun. 7, 2012, 3 pages.
Mining Social Networks, Untangling the social Web, http://www.economist.com/node/16910031?story_id=16910031&fsrc=rss, Sep. 2, 2010, printed Nov. 6, 2010, 5 pages.
Mori et al., "Improving Deployability of Peer-Assisted CDN Platform with Incentive", Proceedings of IEEE Global Telecommunications Conference GLOBECOM 2009, Honolulu, Hawaii, USA, 2009, 7 pages.
Mui et al., "A Computational Model of Trust and Reputation", Proceedings of the 35th Annual Hawaii International Conference on System Sciences, HICSS '02, vol. 7, 2002, 9 pages.
Notice of Allowance received for U.S. Appl. No. 15/224,172, dated Oct. 14, 2016, 35 pages.
Notice of Allowance received for U.S. Appl. No. 15/056,484, dated Jul. 13, 2016, 31 pages.
Non-Final Office Action received for U.S. Appl. No. 15/079,952, dated Jul. 14, 2016, 26 pages.
Notice of Allowance received for U.S. Appl. No. 14/664,285, dated Oct. 7, 2016, 27 pages.
Notice of Allowance received for U.S. Appl. No. 15/070,643, dated Apr. 7, 2017, 28 pages.
Notice of Allowance received for U.S. Appl. No. 15/406,405, dated Apr. 6, 2017, 27 pages.
Non-Final Office Action for U.S. Appl. No. 15/070,643, dated Feb. 24, 2017, 38 pages.
Safaei et al., "Social Graph Generation & Forecasting Using Social Network Mining", Proceedings of the 33rd Annual IEEE International Computer Software and Applications Conference, COMPSAC '09, 2009, pp. 31-35.
"Startup Wants to Base Your Credit Score on Social Media Profiles", Mashable, Technology Review 7, Jun. 7, 2012, 18 pages.
Office Action received for Taiwanese Patent Application No. 105108584 dated Oct. 31, 2016, 7 pages.
Wallentin et al., "A Cross-Layer Route Discovery Strategy for Virtual Currency Systems in Mobile Ad Hoc Networks", Proceedings of the Seventh International Conference on Wireless On-demand Network Systems and Services IEEE/IFIP WONS 2010, Kranjska Gora, Slovenia, 2010, pp. 91-98.
Zetter, "Tracking Terrorists the Las Vegas Way", http://pcworld.about.com/news/Aug072002id103692.htm, printed Nov. 6, 2010, 3 pages.
Zhang et al., "A Review of Incentive Mechanisms in Peer-to-Peer Systems", Proceedings of the First International Conference on Advances in P2P Systems AP2PS'09, Sliema, Malta, 2009, pp. 45-50.
Zhang et al., "March: A Distributed Incentive Scheme for Peer-to-Peer Networks", Proceedings of the 26th Annual IEEE Conference on Computer Communication INFOCOM 2007, Anchorage, Alaska, USA, 2007, pp. 1091-1099.
Non-Final Office Action received for U.S. Appl. No. 13/498,429, dated Apr. 17, 2014, 24 pages.
Non-Final Office Action received for U.S. Appl. No. 13/498,429, dated Jul. 25, 2014, 18 pages.
Final Office Action received for U.S. Appl. No. 13/498,429, dated Jan. 16, 2015, 21 pages.
Non-Final Office Action received for U.S. Appl. No. 14/282,935, dated Jul. 21, 2014, 26 pages.
Final Office Action received for U.S. Appl. No. 14/282,935, dated Jan. 30, 2015, 42 pages.
Non-Final Office Action received for U.S. Appl. No. 14/282,935, dated Aug. 5, 2015, 7 pages.
Final Office Action received for U.S. Appl. No. 14/282,935, dated Feb. 12, 2016, 13 pages.
Non-Final Office Action received for U.S. Appl. No. 15/254,642, dated Dec. 28, 2016, 29 pages.
EPO. Mitteilung des Europischen Patentamts vom 1. Oct. 2007 ber Geschftsmethoden = Notice from the European Patent Office dated Oct. 1, 2007 concerning business methods = Communiqu de l'Office europen des brevets, en date du 1er Oct. 2007, concernant les mthodes dans le domaine des activites economiques. vol. 30,Nr: 11, pp. 592-593. Journal Officiel de L'office Europeen Des Brevets. Official Journal of the European Patent Office.Amtsblattt Des Europaeischen Patenta, Nov. 11, 2007 OEB, Munchen, DE.
Final Office Action received for U.S. Appl. No. 15/046,041 dated Sep. 10, 2019, 23 pages.
Final Office Action received for U.S. Appl. No. 16/014,032 dated Oct. 1, 2019, 35 pages.
Non-Final Office Action received for U.S. Appl. No. 16/410,272 dated Oct. 11, 2019, 65 pages.
Canadian Office Action received for Patent Application Serial No. 2,775,899 dated Oct. 8, 2019, 6 pages.
Indian First Office Action received for Indian Patent Application Serial No. 735/KOLNP/2012 dated Aug. 23, 2019, 7 pages.
Notice Before Examining Pursuant to Section 41 of Law and Rule 66 of the Regulations received for Israel patent Application No. 261207 dated Oct. 27, 2019, 2 pages.
Notice Before Examining Pursuant to Section 41 of Law and Rule 66 of the Regulations received for Israel patent Application No. 261921 dated Nov. 4, 2019, 2 pages.
Non-Final Office Action received for U.S. Appl. No. 15/474,785 dated Nov. 12, 2019, 127 pages.
Extended European Search Report for European Patent Application No. 17840662.5 dated Jan. 2, 2020, 9 pages.
Second Office Action received for Chinese Patent Application Serial No. 201610392929.2 dated Nov. 20, 2019, 8 pages.
Final Office Action received for U.S. Appl. No. 15/644,356 dated Dec. 30, 2019, 68 pages.
Notice Before Examining Pursuant to Section 41 of Law and Rule 66 of the Regulations received for Israel patent Application No. 261464 dated Nov. 4, 2019, 2 pages.
Notice Before Examining Pursuant to Section 41 of Law and Rule 66 of the Regulations received for Israel patent Application No. 261465 dated Nov. 4, 2019, 2 pages.

(56) References Cited

OTHER PUBLICATIONS

Notification under Section 18 of the Law received for Israel patent Application No. 264827 dated Jan. 7, 2020, 2 pages.
Communication pursuant to Rules 70(2) and 70a(2) EPC received for EP Patent Application Serial No. 17840662.5 dated Jan. 21, 2020, 1 page.
Office Action received for Brazialian Patent Application Serial No. BR112012007316-8 dated Mar. 10, 2020, 5 pages (Including English Translation).
Final Office Action received for U.S. Appl. No. 15/907,164 dated Apr. 30, 2020, 56 pages.
Notice of allowance received for Israel patent Application No. 261465 dated Mar. 17, 2020, 3 pages.
Notice of allowance received for Israel patent Application No. 261921 dated Mar. 19, 2020, 02 pages.
Notice of allowance received for Israel patent Application No. 261207 dated Mar. 15, 2020, 02 pages.
Notice of Allowance received for U.S. Appl. No. 16/410,272 dated Apr. 28, 2020, 54 pages.
Notice of allowance received for Israel patent Application No. 261464 dated Jul. 1, 2020, 5 pages.
Non-Final Office Action received for U.S. Appl. No. 16/534,474 dated Jul. 2, 2020, 99 pages.
Final Office Action received for U.S. Appl. No. 16/166,581 dated Jul. 28, 2020, 74 pages.
Canadian Office Action received for Canadian Application Serial No. 3,033,793 dated Sep. 2, 2020, 6 pages.
Communication pursuant to Article 94(3) EPC for European Patent Application No. 17840662.5 dated Aug. 31, 2020, 8 pages.
Canadian Office Action for Canadian Application Serial No. 2,775,899 dated Oct. 7, 2020, 3 pages.
Final Office Action received for U.S. Appl. No. 15/474,785 dated Oct. 16, 2020, 55 pages.
Final Office Action received for U.S. Appl. No. 16/534,474 dated Mar. 10, 2021, 41 pages.
Non-Final Office Action received for U.S. Appl. No. 16/835,433 dated Mar. 18, 2021, 94 pages.
Notice of Reasons for Refusal received for Japanese Application Serial No. 2019-500705 dated Apr. 6, 2021, 09 pages.
Non-Final Office Action received for U.S. Appl. No. 17/158,840 dated May 19, 2021, 38 pages.
Non-Final Office Action received for U.S. Appl. No. 16/801,295 dated Jun. 15, 2021, 111 pages.
Non-Final Office Action received for U.S. Appl. No. 16/661,182 dated Jun. 16, 2021, 88 pages.
Non-Final Office Action received for U.S. Appl. No. 16/774,744 dated Jun. 24, 2021, 126 pages.
Non-Final Office Action received for U.S. Appl. No. 16/745,498 dated Aug. 3, 2021, 105 pages.
Non-Final Office Action received for U.S. Appl. No. 16/773,382 dated Jul. 28, 2021, 110 pages.
Liu et al., "Hybrid content filtering and reputation-based popularity for recommending blog articles", Bradford vol. 38, No. 6, Jun. 23, 2014, pp. 788-805.
Office Action received for Mexican Patent Application Serial No. MX/a/2018/010005 dated May 18, 2021, 8 pages.
Notification to Grant Patent Right for Invention received for Chinese Patent Application Serial No. 201780025229.2 dated May 28, 2021, 5 pages (Including English Translation).
Office Action received for Israel Patent Application Serial No. 261464 dated Jul. 25, 2021, 3 pages(Original Copy Only).
Office Action received for Canadian Patent Application Serial No. 3,014,995 dated Aug. 12, 2021, 4 pages.
Office Action received for Canadian Patent Application Serial No. 3,014,361 dated Aug. 18, 2021, 5 pages.
Office Action received for Canadian Patent Application Serial No. 3,016,091 dated Aug. 19, 2021, 7 pages.
Office Action received for Indian Patent Application Serial No. 201847032355 dated Aug. 31, 2021, 6 pages.
Office Action received for Canadian Patent Application Serial No. 3,015,926 dated Aug. 17, 2021, 3 pages.
Non-Final Office Action received for U.S. Appl. No. 17/079,600 dated Dec. 3, 2021, 84 pages.
Office Action received for Indian Patent Application Serial No. 201847032375 dated Oct. 29, 2021, 8 pages.
Office Action received for Taiwan Patent Application No. 106127464 dated Oct. 1, 2021, 17 pages.
Notice of Allowance received for U.S. Appl. No. 17/158,840, dated Dec. 24, 2021, 97 pages.
Office Action received for Canada Patent Application Serial No. 3,205,418 dated Nov. 29, 2024, 6 pages.
Office Action received for Canada Patent Application Serial No. 3,204,616 dated Nov. 22, 2024, 5 pages.
Non-Final Office Action received for U.S. Appl. No. 18/187,040 dated Feb. 12, 2025, 111 pages.
Substantive Examination Report received for Philippine Patent Application No. 12019500317 dated Apr. 27, 2025, 9 pages.
Office Action received for Canada Patent Application No. 3,204,164 dated Apr. 7, 2025, 5 pages.
Non-Final Office Action received for U.S. Appl. No. 18/672,116 dated Dec. 3, 2025, 9 pages.
Fernando et al., "Developing a Distributed Trust Model for Distributed Energy Resources", 2021 IEEE Conference on Technologies for Sustainability (SusTech), 2021, 6 pages.
Ex Parte Quayle Action received for U.S. Appl. No. 18/732,740 dated Sep. 30, 2025, 8 pages.
U.S. Appl. No. 17/659,292, filed Apr. 14, 2022.
U.S. Appl. No. 17/158,840, filed Jan. 26, 2021.
U.S. Appl. No. 16/166,581, filed Oct. 22, 2018.
U.S. Appl. No. 15/671,102, filed Aug. 7, 2017.
U.S. Appl. No. 15/254,642, filed Sep. 1, 2016.
U.S. Appl. No. 14/282,935, filed May 20, 2014.
U.S. Appl. No. 13/498,429, filed Mar. 27, 2012.
Non-Final Office Action received for U.S. Appl. No. 19/170,732 dated Mar. 25, 2026, 29 pages.
Quantummechanic, "Proof of Stake Instead of Proof of Work", Bitcoin Talk Forum Post, Online available at URL: https://bitcointalk.org/index.php?action=printpage;topic=27787.0, Jul. 11, 2011, 12 pages.
Non-Final Office Action received for U.S. Appl. No. 19/019,618 dated May 1, 2026, 8 pages.
Non-Final Office Action received for U.S. Appl. No. 19/214,111 dated May 6, 2026, 56 pages.
Non-Final Office Action received for U.S. Appl. No. 19/405,587 dated Apr. 30, 2026, 15 pages.
Non-Final Office Action received for U.S. Appl. No. 19/405,718 dated Feb. 19, 2026, 25 pages.
Nakamoto, Satoshi, "Bitcoin: A Peer-to-Peer Electronic Cash System", Online available at URL: https://bitcoin.org/bitcoin.pdf, 2008, 9 pages.
Notice of hearing received for Indian Patent Application Serial No. 735/KOLNP/2012 dated Mar. 12, 2026, 3 pages.
Final Office Action received for U.S. Appl. No. 19/405,718 dated Jun. 9, 2026, 32 pages.
Notice of Allowance received for U.S. Appl. No. 18/672,116 dated Jun. 30, 2026, 115 pages.
Zhang, et al. "A trust model for multimedia social networks, " Springer-Verlag. 2012.

* cited by examiner

Figure 3B:
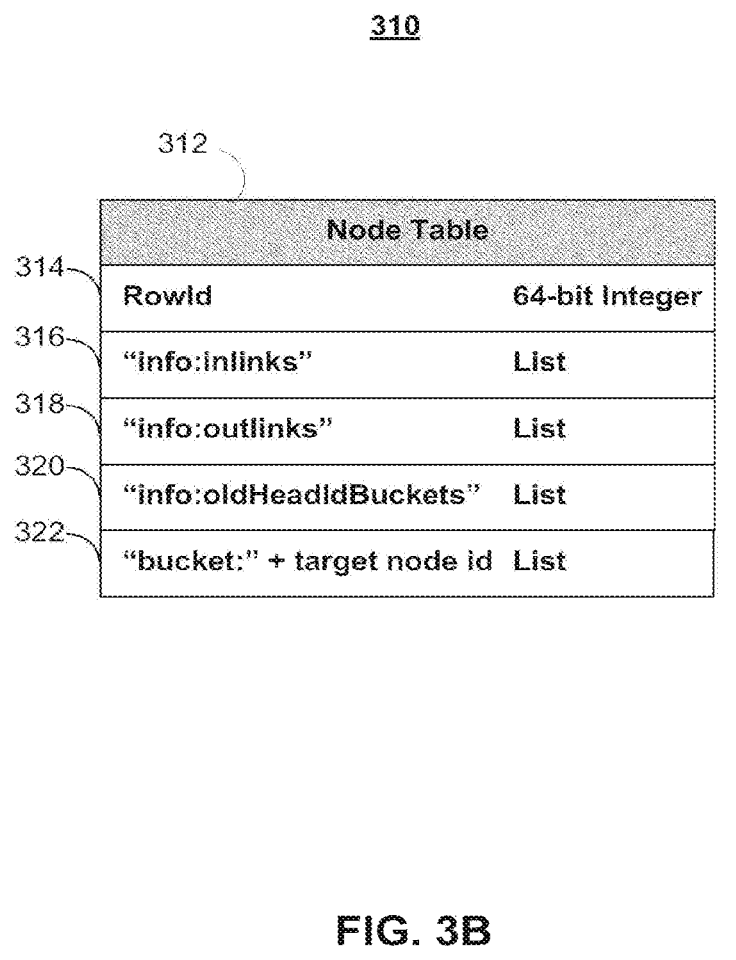

310

312

| Node Table | |
|---|---|
| RowId | 64-bit Integer |
| "info:inlinks" | List |
| "info:outlinks" | List |
| "info:oldHeadIdBuckets" | List |
| "bucket:" + target node id | List |

SYSTEMS AND METHODS FOR SOCIAL GRAPH DATA ANALYTICS TO DETERMINE CONNECTIVITY WITHIN A COMMUNITY

CROSS-REFERENCE TO RELATED APPLICATIONS

This application is a continuation application of U.S. patent application Ser. No. 17/659,292 filed Apr. 14, 2022, now U.S. Pat. No. 11,968,105, which is a continuation of U.S. patent application Ser. No. 17/158,840 filed Jan. 26, 2021, now U.S. Pat. No. 11,323,347, which is a continuation of U.S. patent application Ser. No. 16/166,581 filed Oct. 22, 2018, now abandoned, which is a continuation of U.S. patent application Ser. No. 15/671,102 filed Aug. 7, 2017, now U.S. Pat. No. 10,127,618, which is a continuation application of U.S. patent application Ser. No. 15/254,642, filed Sep. 1, 2016, now U.S. Pat. No. 9,747,650, issued Aug. 29, 2017, which is a continuation application of U.S. patent application Ser. No. 14/282,935, filed May 20, 2014, now U.S. Pat. No. 9,460,475, issued Oct. 4, 2016, which is a continuation application of U.S. patent application Ser. No. 13/498,429, filed Mar. 27, 2012, now U.S. Pat. No. 9,171,338 issued Oct. 27, 2015, which is a national stage filing under 35 U.S.C. § 371 of International Application No. PCT/CA2010/001531, filed Sep. 30, 2010, which claims the benefit of the filing date under 35 U.S.C. § 119(e) to U.S. Provisional Application Ser. No. 61/247,343, filed Sep. 30, 2009. The aforementioned, earlier-filed applications are hereby incorporated by reference herein in their entireties.

BACKGROUND OF THE INVENTION

This invention relates generally to networks of individuals and/or entities and network communities and, more particularly, to systems and methods for determining trust scores or connectivity within or between individuals and/or entities or networks of individuals and/or entities.

The connectivity, or relationships, of an individual or entity within a network community may be used to infer attributes of that individual or entity. For example, an individual or entity's connectivity within a network community may be used to determine the identity of the individual or entity (e.g., used to make decisions about identity claims and authentication), the trustworthiness or reputation of the individual or entity, or the membership, status, and/or influence of that individual or entity in a particular community or subset of a particular community.

An individual or entity's connectivity within a network community, however, is difficult to quantify. For example, network communities may include hundreds, thousands, millions, billions or more members. Each member may possess varying degrees of connectivity information about itself and possibly about other members of the community. Some of this information may be highly credible or objective, while other information may be less credible and subjective. In addition, connectivity information from community members may come in various forms and on various scales, making it difficult to meaningfully compare one member's "trustworthiness" or "competence" and connectivity information with another member's "trustworthiness" or "competence" and connectivity information. Also, many individuals may belong to multiple communities, further complicating the determination of a quantifiable representation of trust and connectivity within a network community. Even if a quantifiable representation of an individual's connectivity is determined, it is often difficult to use this representation in a meaningful way to make real-world decisions about the individual (e.g., whether or not to trust the individual).

Further, it may be useful for these real-world decisions to be made prospectively (i.e., in advance of an anticipated event). Such prospective analysis may be difficult as an individual or entity's connectivity within a network community may change rapidly as the connections between the individual or entity and others in the network community may change quantitatively or qualitatively. This analysis becomes increasingly complex as if applied across multiple communities.

SUMMARY OF THE INVENTION

In view of the foregoing, systems and methods are provided for determining the connectivity between nodes within a network community and inferring attributes, such as trustworthiness or competence, from the connectivity. Connectivity may be determined, at least in part, using various graph traversal and normalization techniques described in more detail below.

In an embodiment, a path counting approach may be used where processing circuitry is configured to count the number of paths between a first node $n_1$ and a second node $n_2$ within a network community. A connectivity rating $R_{n1n2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user (i.e., the out-link values). If $t_i$ is the user connectivity value assigned to link i, then the relative user weight, $w_i$, assigned to that link may be given in accordance with:

$$w_i = 1 + (t_i - \bar{t}_i)^2 \quad (1)$$

To determine the overall weight of a path, in some embodiments, the weights of all the links along the path may be multiplied together. The overall path weight may then be given in accordance with:

$$w_{path} = \Pi(w_i) \quad (2)$$

The connectivity value for the path may then be defined as the minimum user connectivity value of all the links in the path multiplied by the overall path weight in accordance with:

$$t_{path} = w_{path} \times t_{min} \quad (3)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, and weight values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster. For example, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold may be ignored in a connectivity determination or connectivity computation, while only weights of sufficient magnitude may be considered.

In some embodiments, a user connectivity value may represent the degree of trust between a first node and a second node. In one embodiment, node $n_1$ may assign a user connectivity value of/to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. For example, one or more of the individual or entity's reputation, status, and/or influence within the network community (or some other community), the individual or entity's alignment with the trusting party (e.g., political, social, or religious alignment), past dealings with the individual or entity, and the individual or entity's character and integrity (or any other relevant considerations) may be used to determine a partially subjective user connectivity value indicative of trust. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

In some embodiments, a decision-making algorithm may access the connectivity values in order to make automatic decisions (e.g., automatic network-based decisions, such as authentication or identity requests) on behalf of a user. Connectivity values may additionally or alternatively be outputted to external systems and processes located at third-parties. The external systems and processes may be configured to automatically initiate a transaction (or take some particular course of action) based, at least in part, on received connectivity values. For example, electronic or online advertising may be targeted to subgroups of members of a network community based, at least in part, on network connectivity values.

In some embodiments, a decision-making algorithm may access the connectivity values to make decisions prospectively (e.g., before an anticipated event like a request for credit). Such decisions may be made at the request of a user, or as part of an automated process (e.g., a credit bureau's periodic automated analysis of a database of customer information). This prospective analysis may allow for the initiation of a transaction (or taking of some particular action) in a fluid and/or dynamic manner.

BRIEF DESCRIPTION OF THE DRAWINGS

The above and other features of the present invention, its nature and various advantages will be more apparent upon consideration of the following detailed description, taken in conjunction with the accompanying drawings, and in which:

FIGS. 3A and 3B show illustrative data tables for supporting connectivity determinations within a network community in accordance with one embodiment of the invention;

DETAILED DESCRIPTION

Systems and methods for determining the connectivity between nodes in a network community are provided. As defined herein, a "node" may include any user terminal, network device, computer, mobile device, access point, or any other electronic device. In some embodiments, a node may also represent an individual human being, entity (e.g., a legal entity, such as a public or private company, corporation, limited liability company (LLC), partnership, sole proprietorship, or charitable organization), concept (e.g., a social networking group), animal, or inanimate object (e.g., a car, aircraft, or tool). As also defined herein, a "network community" may include a collection of nodes and may represent any group of devices, individuals, or entities.

For example, all or some subset of the users of a social networking website or social networking service (or any other type of website or service, such as an online gaming community) may make up a single network community. Each user may be represented by a node in the network community. As another example, all the subscribers to a particular newsgroup or distribution list may make up a single network community, where each individual subscriber may be represented by a node in the network community. Any particular node may belong in zero, one, or more than one network community, or a node may be banned from all, or a subset of, the community. To facilitate network community additions, deletions, and link changes, in some embodiments a network community may be represented by a directed graph, or digraph, weighted digraph, tree, or any other suitable data structure.

Figure 1:
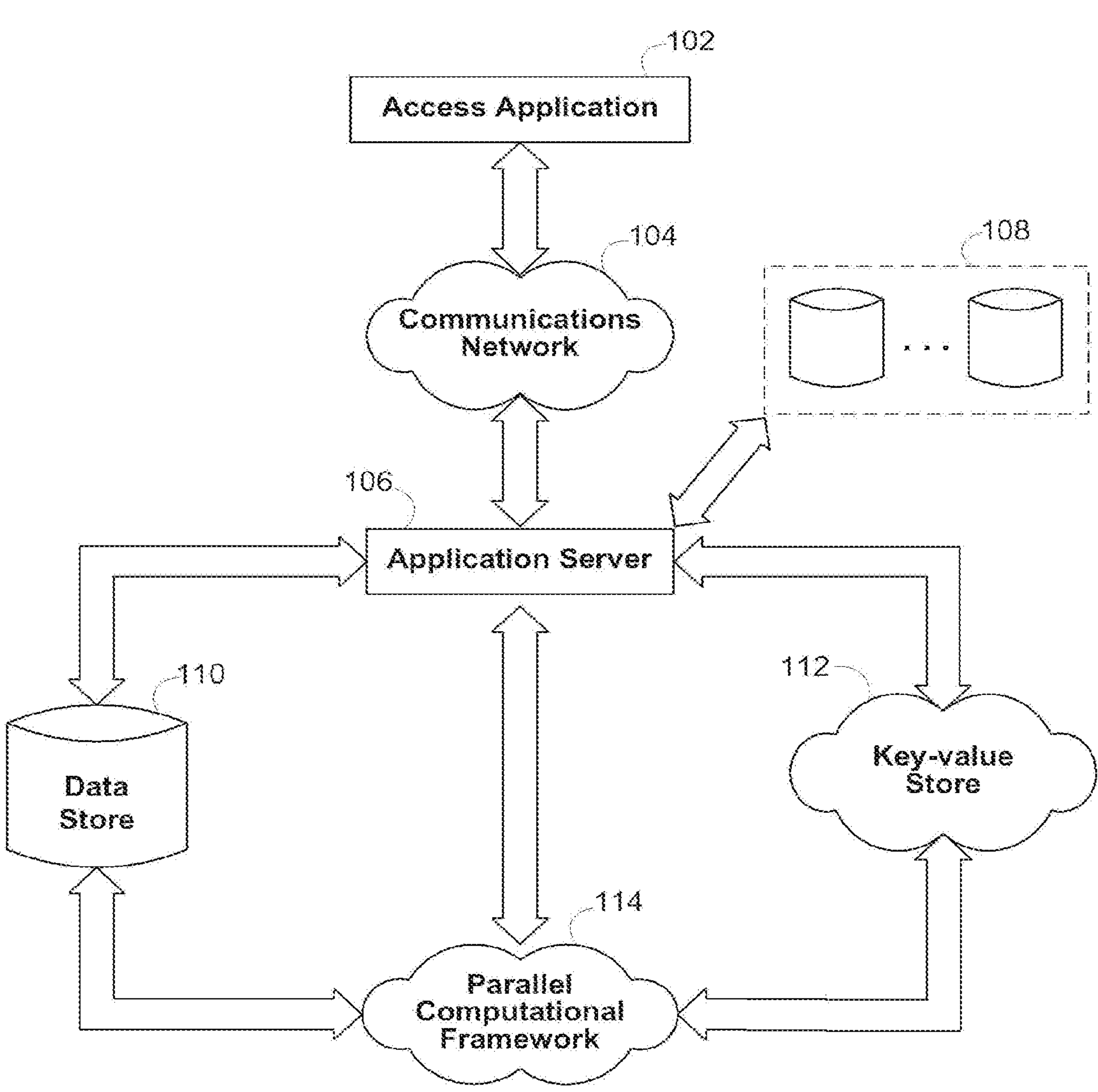
FIG. 1 is an illustrative block diagram of a network architecture used to support connectivity within a network community in accordance with one embodiment of the invention.

FIG. 1 shows illustrative network architecture 100 used to support the connectivity determinations within a network community. A user may utilize access application 102 to access application server 106 over communications network 104. For example, access application 102 may include a standard web browser, application server 106 may include a web server, and communication network 106 may include the Internet. Access application 102 may also include proprietary applications specifically developed for one or more platforms or devices. For example, access application 102 may include one or more instances of an Apple IOS, Android, or WebOS application or any suitable application for use in accessing application 106 over communications network 104. Multiple users may access application service 106 via one or more instances of access application 102. For example, a plurality of mobile devices may each have an instance of access application 102 running locally on the devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more microprocessors), memory (e.g., RAM, ROM, and hybrid types of memory), storage devices (e.g., hard drives, optical drives, and tape drives). The processing circuitry included in application server 106 may execute a server process for supporting the network connectivity determinations of the present invention, while access application 102 executes a corresponding client process. The processing circuitry included in application server 106 may also perform any of the calculations and computations described herein in connection with determining network connectivity. In some embodiments, a computer-readable medium with computer program logic recorded thereon is included within application server 106. The computer program logic may determine the connectivity between two or more nodes in a network community and it may or may not output such connectivity to a display screen or data For example, application server 106 may access data sources 108 over the Internet, a secured private LAN, or any other communications network. Data sources 108 may include one or more third-party data sources, such as data from third-party social networking services and third-party ratings bureaus. For example, data sources 108 may include user and relationship data (e.g., "friend" or "follower" data) from one or more of Facebook, MySpace, openSocial, Friendster, Bebo, hi5, Orkut, PerfSpot, Yahoo! 360, LinkedIn, Twitter, Google Buzz, Really Simple Syndication readers or any other social networking website or information service. Data sources 108 may also include data stores and databases local to application server 106 containing relationship information about users accessing application server 106 via access application 102 (e.g., databases of addresses, legal records, transportation passenger lists, gambling patterns, political and/or charity donations, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 300 (FIG. 3A) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs. For each input key-value pair, the map task may invoke a user defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
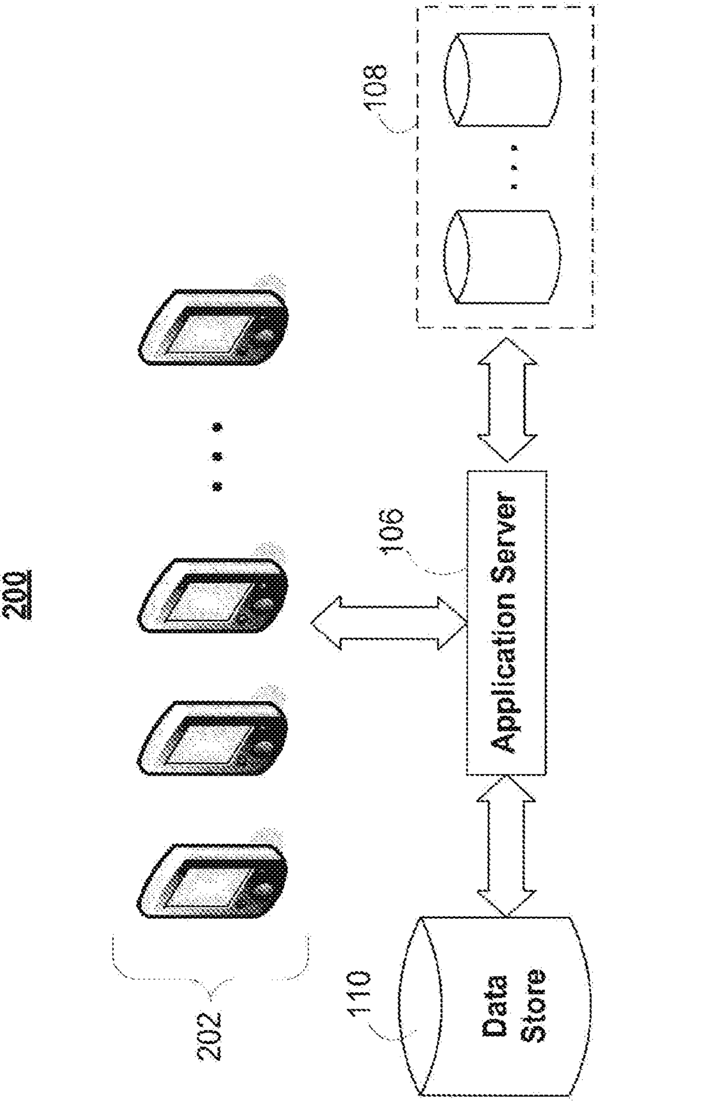
FIG. 2 is another illustrative block diagram of a network architecture used to support connectivity within a network community in accordance with one embodiment of the invention.

Although FIG. 1, in order to not over-complicate the drawing, only shows a single instance of access application 102, communications network 104, application server 106, data source 108, data store 110, key-value store 112, and parallel computational framework 114, in practice network architecture 100 may include multiple instances of one or more of the foregoing components. In addition, key-value store 112 and parallel computational framework 114 may also be removed, in some embodiments. As shown in network architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially-configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3A:
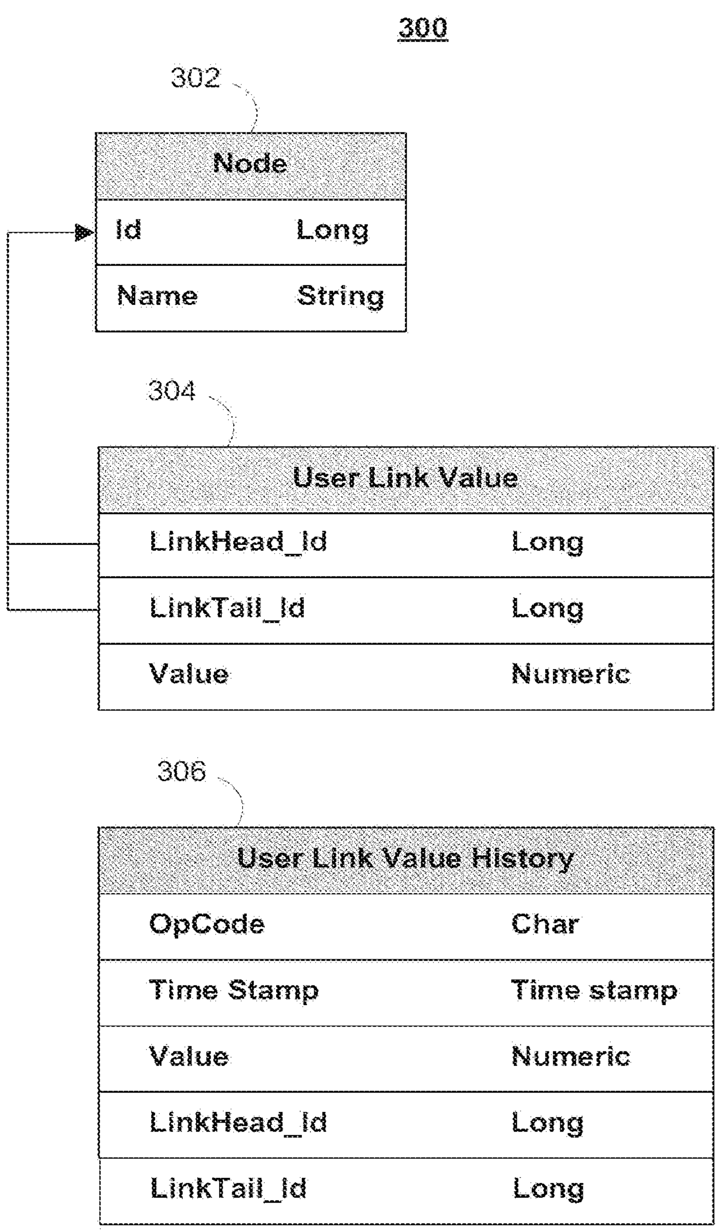

FIG. 3A shows illustrative data tables 300 used to support the connectivity determinations of the present invention. One or more of tables 300 may be stored in, for example, a relational database in data store 110 (FIG. 1). Table 302 may store an identification of all the nodes registered in the network community. A unique identifier may be assigned to each node and stored in table 302. In addition, a string name may be associated with each node and stored in table 302. As described above, in some embodiments, nodes may represent individuals or entities, in which case the string name may include the individual or person's first and/or last name, nickname, handle, or entity name.

Table 304 may store user connectivity values. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes and the result of the interaction. For example, each simple email exchange between two nodes may automatically increase or decrease the user connectivity values connecting those two nodes by a fixed amount. More complicated interactions (e.g., product or service sales or inquires) between two nodes may increase or decrease the user connectivity values connecting those two nodes by some larger fixed amount. In some embodiments, user connectivity values between two nodes may always be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. As described above, user connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. A composite user connectivity value including subjective and objective components may also be used. For example, third-party information may be consulted to form an objective component based on, for example, the number of consumer complaints, credit score, socio-economic factors (e.g., age, income, political or religions affiliations, and criminal history), or number of citations/hits in the media or in search engine searches. Third-party information may be accessed using communications network 104 (FIG. 1). For example, a third-party credit bureau's database may be polled or a personal biography and background information, including criminal history information, may be accessed from a third-party database or data source (e.g., as part of data sources 108 (FIG. 1) or a separate data source) or input directly by a node, user, or system administrator.

Table 304 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 306 may store an audit log of table 304. Table 306 may be analyzed to determine which nodes or links have changed in the network community. In some embodiments, a database trigger is used to automatically insert an audit record into table 306 whenever a change of the data in table 304 is detected. For example, a new link may be created, a link may be removed, or a user connectivity value may be changed. This audit log may allow for decisions related to connectivity values to be made prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner. After such a change is detected, the trigger may automatically create a new row in table 306. Table 306 may store an identification of the changed node, and identification of the changed link head, changed link tail, and the user connectivity value to be assigned to the changed link. Table 306 may also store a timestamp indicative of the time of the change and an operation code. In some embodiments, operation codes may include "insert," "update," or "delete" operations, corresponding to whether a link was inserted, a user connectivity value was changed, or a link was deleted, respectively. Other operation codes may be used in other embodiments.

FIG. 3B shows illustrative data structure 310 used to support the connectivity determinations of the present invention. In some embodiments, data structure 310 may be stored using key-value store 112 (FIG. 1), while tables 300 are stored in data store 110 (FIG. 1). As described above, key-value store 112 (FIG. 1) may implement an HBase storage system and include BigTable support. Like a traditional relational database management system, the data shown in FIG. 3B may be stored in tables. However, the BigTable support may allow for an arbitrary number of columns in each table, whereas traditional relational database management systems may require a fixed number of columns.

Figure 4A:
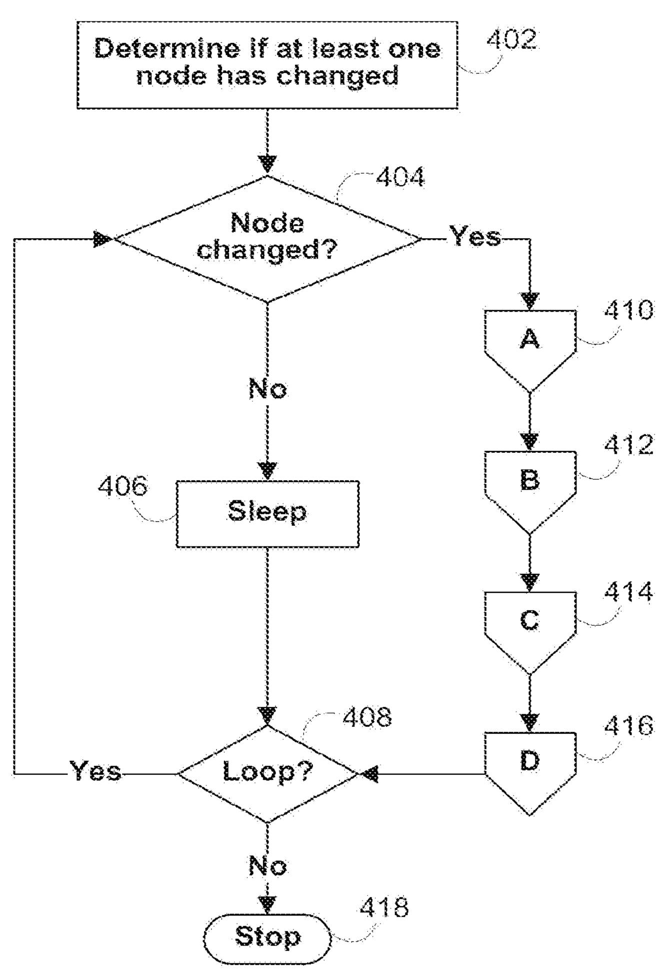
FIGS. 4A-4E show illustrative processes for supporting connectivity determinations within a network community in accordance with one embodiment of the invention.

Data structure 310 may include node table 312. In the example shown in FIG. 3B, node table 312 includes several columns. Node table 312 may include row identifier column 314, which may store 64-bit, 128-bit, 256-bit, 512-bit, or 1024-bit integers and may be used to uniquely identify each row (e.g., each node) in node table 312. Column 316 may include a list of all the incoming links for the current node. Column 318 may include a list of all the outgoing links for the current node. Column 320 may include a list of node identifiers to which the current node is connected. A first node may be connected to a second node if outgoing links may be followed to reach the second node. For example, for A→B, A is connected to B, but B may not be connected to A. As described in more detail below, column 320 may be used during the portion of process 400 (FIG. 4A) shown in FIG. 4B. Node table 312 may also include one or more "bucket" columns 322. These columns may store a list of paths that connect the current node to a target node. As described above, grouping paths by the last node in the path (e.g., the target node) may facilitate connectivity computations. As shown in FIG. 3B, in some embodiments, to facilitate scanning, bucket column names may include the target node identifier appended to the end of the "bucket:" column FIGS. 4A-4D show illustrative processes for determining the connectivity of nodes within a network community. FIG. 4A shows process 400 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIG. 4A-4D may be executed to make decisions prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner.

At step 402, a determination is made whether at least one node has changed in the network community. As described above, an audit record may be inserted into table 306 (FIG. 3) after a node has changed. By analyzing table 306 (FIG. 3), a determination may be made (e.g., by application server 106 of FIG. 1) that a new link has been added, an existing link has been removed, or a user connectivity value has changed. If, at step 404, it is determined that a node has changed, then process 400 continues to step 410 (shown in FIG. 4B) to prepare the changed nodes, step 412 (shown in FIG. 4C) to calculate paths originating from the changed nodes, step 414 (shown in FIG. 4D) to remove paths that go through a changed node, and step 416 (shown in FIG. 4E) to calculate paths that go through a changed node. It should be noted that more than one step or task shown in FIGS. 4B, 4C, 4D, and 4E may be performed in parallel using, for example, a cluster of cores. For example, multiple steps or tasks shown in FIG. 4B may be executed in parallel or in a distributed fashion, then multiple steps or tasks shown in FIG. 4C may be executed in parallel or in a distributed fashion, then multiple steps or tasks shown in FIG. 4D may be executed in parallel or in a distributed fashion, and then multiple steps or tasks shown in FIG. 4E may be executed in parallel or in a distributed fashion. In this way, overall latency associated with process 400 may be reduced.

If a node change is not detected at step 404, then process 400 enters a sleep mode at step 406. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 416 or after a period of sleep at step 406, process 400 may determine whether or not to loop at step 408. For example, if all changed nodes have been updated, then process 400 may stop at step 418. If, however, there are more changed nodes or links to process, then process 400 may loop at step 408 and return to step 404.

In practice, one or more steps shown in process 400 may be combined with other steps, performed in any suitable order, performed in parallel (e.g., simultaneously or substantially simultaneously), or removed.

Figure 4B:
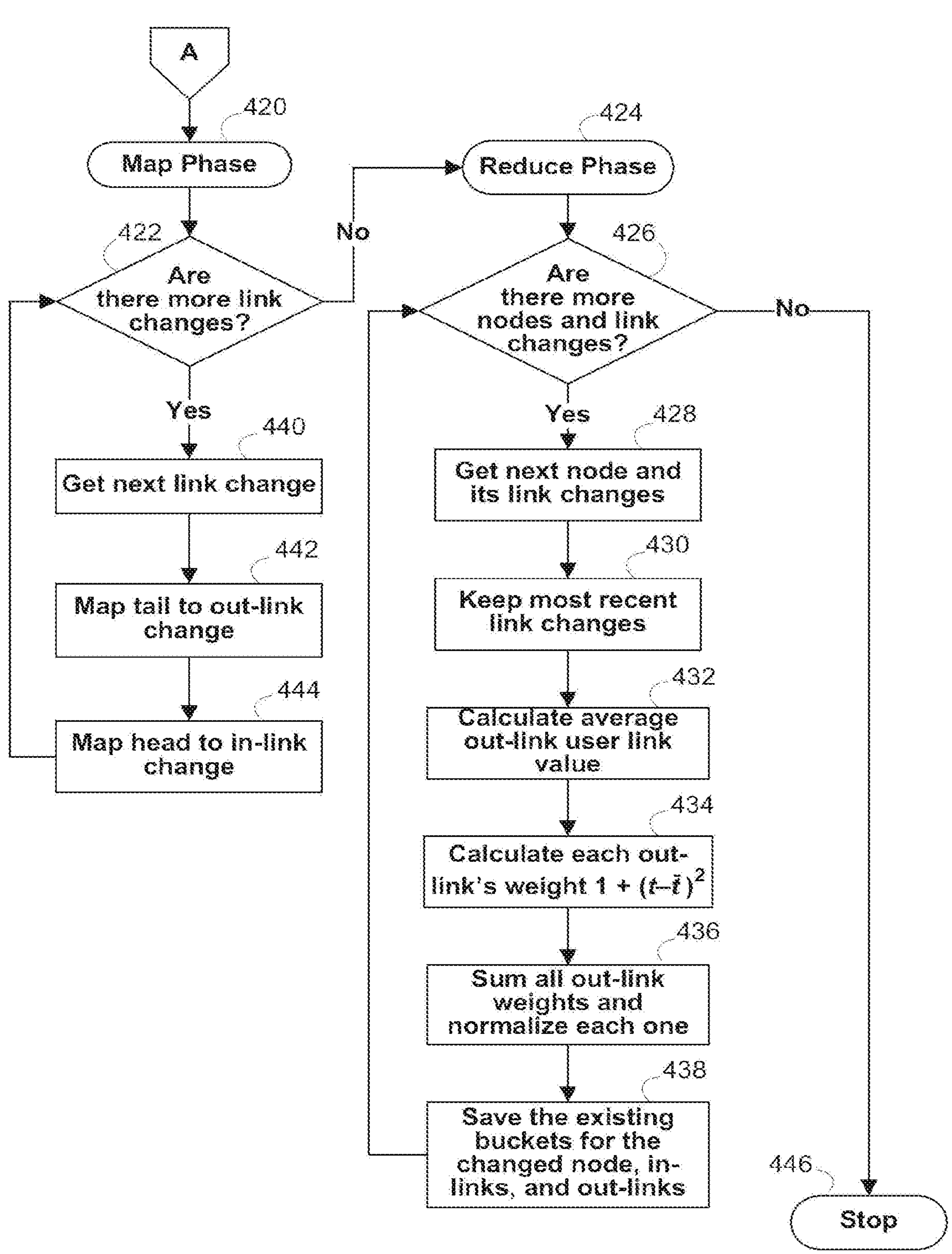

FIGS. 4B-4E each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 4B, in order to prepare any changed nodes, map phase 420 may include determining if there are any more link changes at step 422, retrieving the next link change at step 440, mapping the tail to out-link change at step 442, and mapping the head to in-link change at step 444.

If there are no more link changes at step 422, then, in reduce phase 424, a determination may be made at step 426 that there are more nodes and link changes to process. If so, then the next node and its link changes may be retrieved at step 428. The most recent link changes may be preserved at step 430 while any intermediate link changes are replaced by more recent changes. For example, the timestamp stored in table 306 (FIG. 3) may be used to determine the time of every link or node change. At step 432, the average out-link user connectivity value may be calculated. For example, if node $n_1$ has eight out-links with assigned user connectivity values, these eight user connectivity values may be averaged at step 432. At step 434, each out-link's weight may be calculated in accordance with equation (1) above. All the out-link weights may then be summed and used to normalize each out-link weight at step 436. For example, each out-link weight may be divided by the sum of all out-link weights. This may yield a weight between 0 and 1 for each out-link. At step 438, the existing buckets for the changed node, in-links, and out-links may be saved. For example, the buckets may be saved in key-value store 112 (FIG. 1) or data store 110 (FIG. 1). If there are no more nodes and link changes to process at step 426, the process may stop at step 446.

Figure 4C:
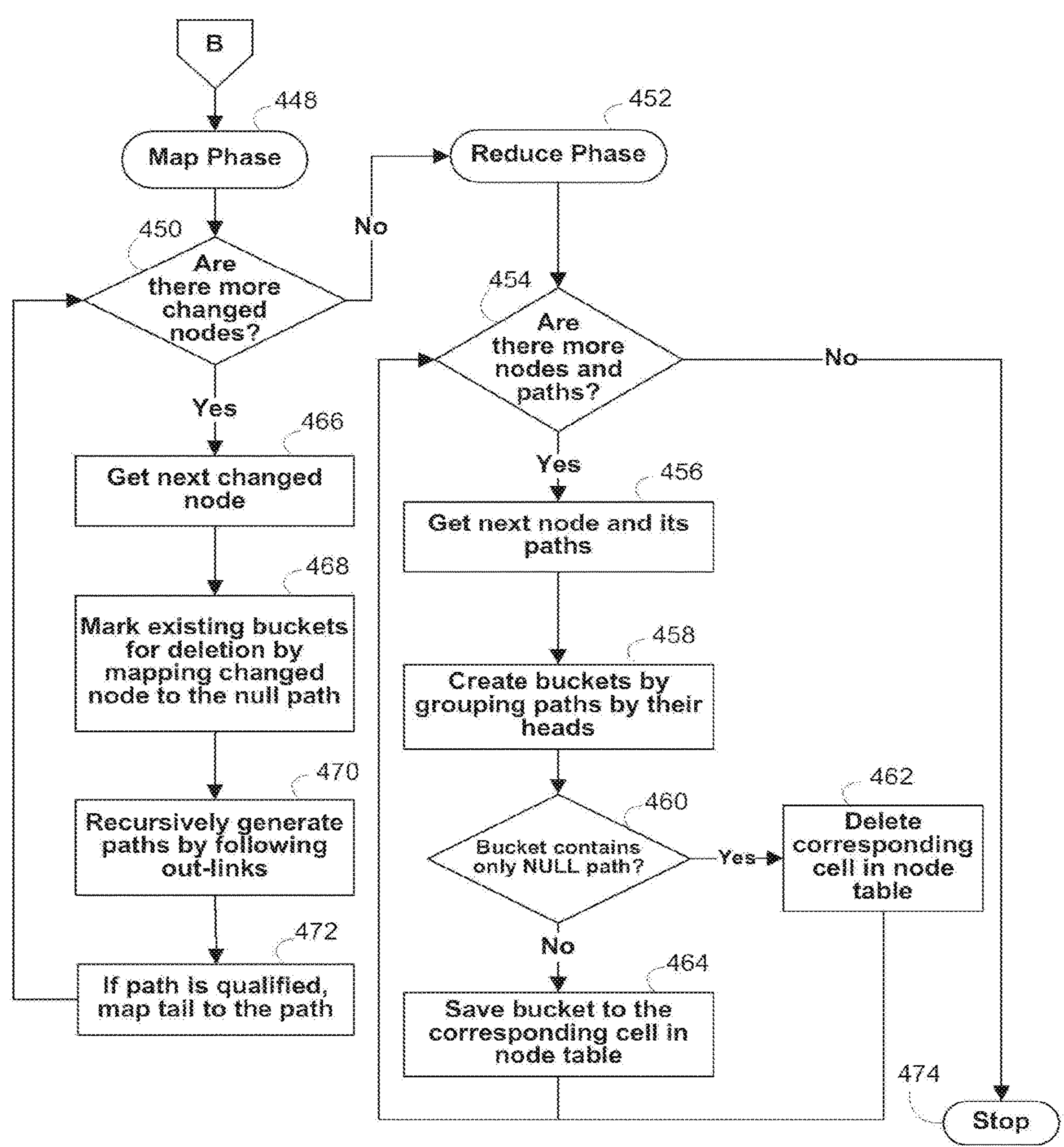

As shown in FIG. 4C, in order to calculate paths originating from changed nodes, map phase 448 may include determining if there are any more changed nodes at step 450, retrieving the next changed node at step 466, marking existing buckets for deletion by mapping changed nodes to the NULL path at step 468, recursively generating paths by following out-links at step 470, and if the path is a qualified path, mapping the tail to the path. Qualified paths may include paths that satisfy one or more predefined threshold functions. For example, a threshold function may specify a minimum path weight. Paths with path weights greater than the minimum path weight may be designated as qualified paths.

If there are no more changed nodes at step 450, then, in reduce phase 452, a determination may be made at step 454 that there are more nodes and paths to process. If so, then the next node and its paths may be retrieved at step 456. At step 458, buckets may be created by grouping paths by their head. If a bucket contains only the NULL path at step 460, then the corresponding cell in the node table may be deleted at step 462. If the bucket contains more than the NULL path, then at step 464 the bucket is saved to the corresponding cell in the node table. If there are no more nodes and paths to process at step 456, the process may stop at step 474.

Figure 4D:
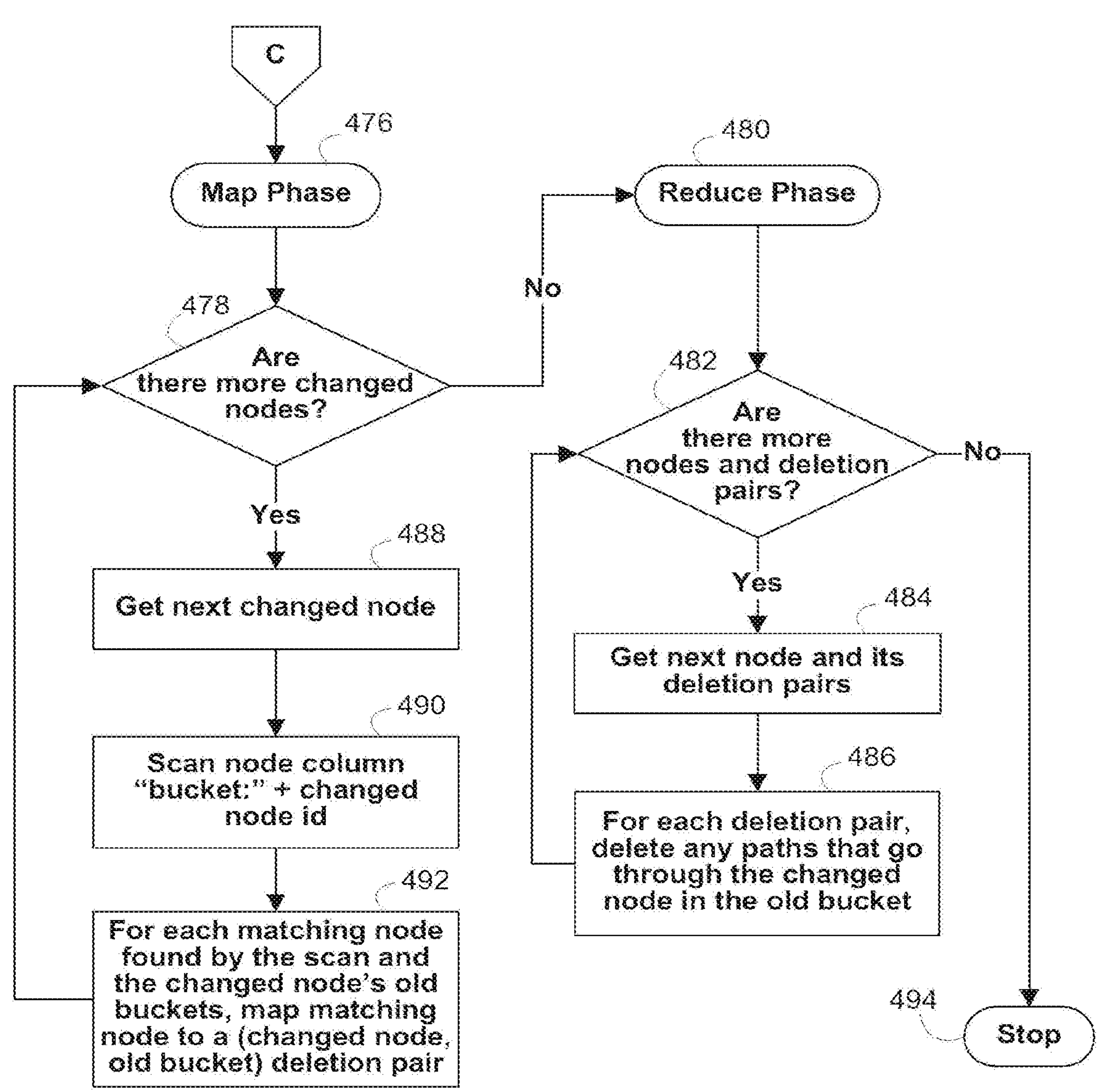

As shown in FIG. 4D, in order to remove paths that go through a changed node, map phase 476 may include determining if there are any more changed nodes at step 478 and retrieving the next changed node at step 488. At step 490, the "bucket:" column in the node table (e.g., column 322 of node table 312 (both of FIG. 3B)) corresponding to the changed node may be scanned. For example, as described above, the target node identifier may be appended to the end of the "bucket:" column name. Each bucket may include a list of paths that connect the current node to the target node (e.g., the changed node). At step 492, for each matching node found by the scan and the changed node's old buckets, the matching node may be matched to a (changed node, old bucket) deletion pair.

If there are no more changed nodes at step 478, then, in reduce phase 480, a determination may be made at step 484 that there are more node and deletion pairs to process. If so, then the next node and its deletion pairs may be retrieved at step 484. At step 486, for each deletion pair, any paths that go through the changed node in the old bucket may be deleted. If there are no more nodes and deletion pairs to process at step 482, the process may stop at step 494.

Figure 4E:
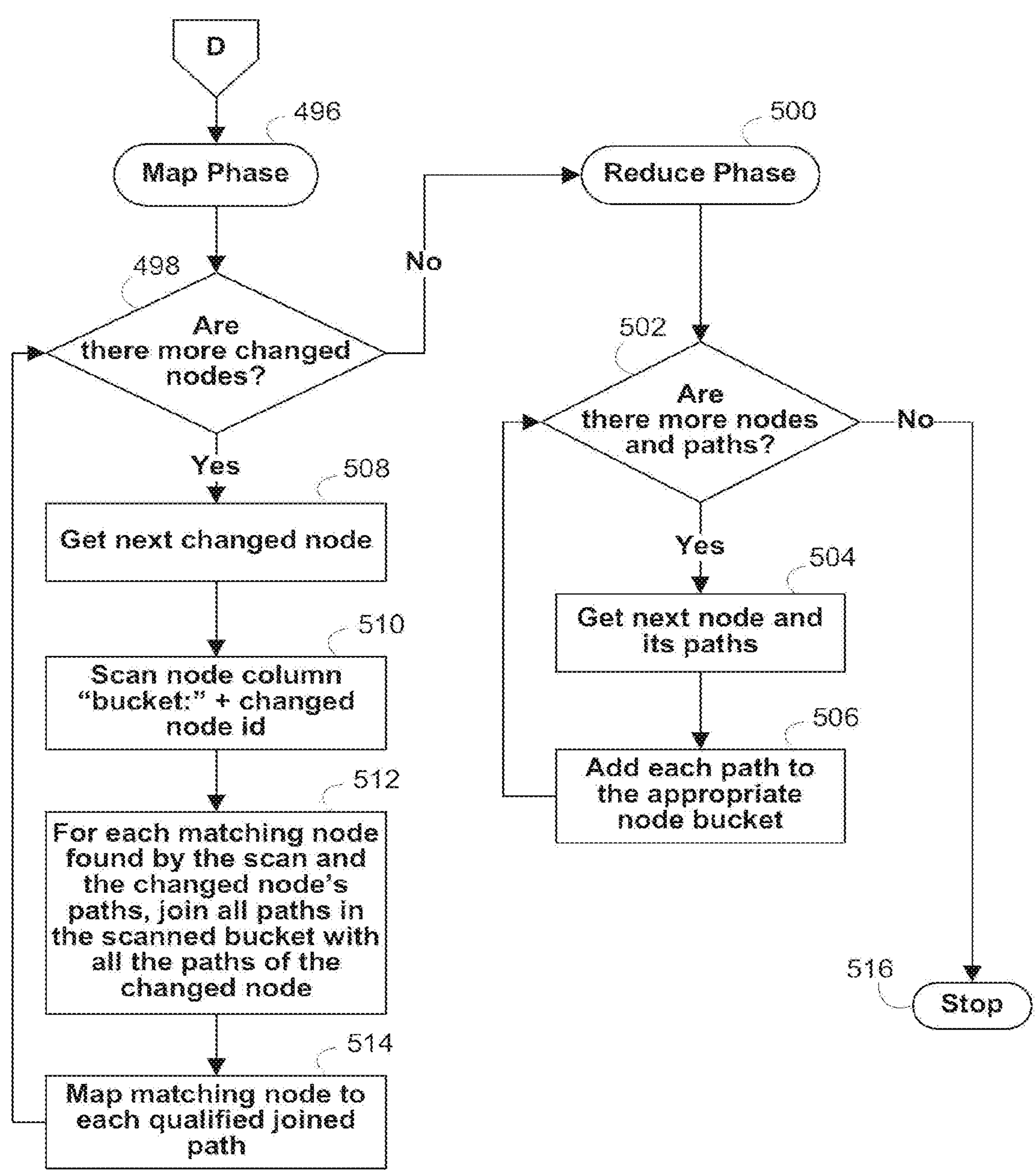

As shown in FIG. 4E, in order to calculate paths that go through a changed node, map phase 496 may include determining if there are any more changed nodes at step 498 and retrieving the next changed node at step 508. At step 510, the "bucket:" column in the node table (e.g., column 322 of node table 312 (both of FIG. 3B)) corresponding to the changed node may be scanned. At step 512, for each matching node found in the scan and the changed node's paths, all paths in the scanned bucket may be joined with all paths of the changed bucket. At step 514, each matching node may be mapped to each qualified joined If there are no more changed nodes at step 498, then, in reduce phase 500, a determination may be made at step 502 that there are more node and paths to process. If so, then the next node and its paths may be retrieved at step 504. Each path may then be added to the appropriate node bucket at step 506. If there are no more nodes and paths to process at step 502, the process may stop at step 516.

Figure 5:
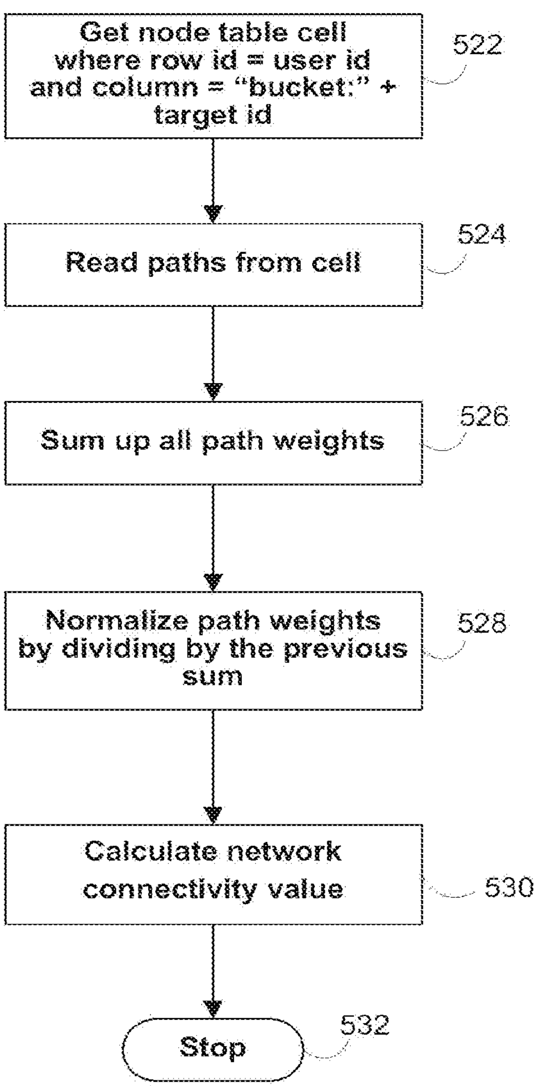
FIG. 5 shows an illustrative process for querying all paths to a target node and computing a network connectivity value in accordance with one embodiment of the invention.

FIG. 5 shows illustrative process 520 for supporting a user query for all paths from a first node to a target node. For example, a first node (representing, for example, a first individual or entity) may wish to know how connected the first node is to some second node (representing, for example, a second individual or entity) in the network community. In the context of trust described above (and where the user connectivity values represent, for example, at least partially subjective user trust values), this query may return an indication of how much the first node may trust the second node. In general, the more paths connecting the two nodes may yield a greater (or lesser if, for example, adverse ratings are used) network connectivity value (or network trust amount).

At step 522, the node table cell where the row identifier equals the first node identifier and the column equals the target node identifier appended to the "bucket:" column name prefix is accessed. All paths may be read from this cell at step 524. The path weights assigned to the paths read at step 524 may then be summed at step 526. At step 528, the path weights may be normalized by dividing each path weight by the computed sum of the path weights. A network connectivity value may then be computed at step 530. For example, each path's user connectivity value may be multiplied by its normalized path weight. The network connectivity value may then be computed in some embodiments in accordance with:

$$t_{network} = \sum t_{path} \times w_{path} \quad (4)$$

where $t_{path}$ is the user connectivity value for a path (given in accordance with equation (3)) and $w_{path}$ is the normalized weight for that path. The network connectivity value may then be held or outputted (e.g., displayed on a display device, output by processing circuitry of application server 106, and/or stored on data store 110 (FIG. 1)). In addition, a decision-making algorithm may access the network connectivity value in order to make automatic decisions (e.g., automatic network-based decisions, such as authentication or identity requests) on behalf of the user. Network connectivity values may additionally or alternatively be outputted to external systems and processes located at third-parties. The external systems and processes may be configured to automatically initiate a transaction (or take some particular course of action) based, at least in part, on the received network connectivity values. Process 520 may stop at step 532.

In practice, one or more steps shown in process 520 may be combined with other steps, performed in any suitable order, performed in parallel (e.g., simultaneously or substantially simultaneously), or removed. In addition, as described above, various threshold functions may be used in order to reduce computational complexity. For example, a threshold function defining the maximum number of links to traverse may be defined. Paths containing more than the threshold specified by the threshold function may not be considered in the network connectivity determination. In addition, various threshold functions relating to link and path weights may be defined. Links or paths below the threshold weight specified by the threshold function may not be considered in the network connectivity determination.

Although process 520 describes a single user query for all paths from a first node to a target node, in actual implementations groups of nodes may initiate a single query for all the paths from each node in the group to a particular target node. For example, multiple members of a network community may all initiate a group query to a target node. Process 520 may return an individual network connectivity value for each querying node in the group or a single composite network connectivity value taking into account all the nodes in the querying group. For example, the individual network connectivity values may be averaged to form a composite value or some weighted average may be used. The weights assigned to each individual network connectivity value may be based on, for example, seniority in the community (e.g., how long each node has been a member in the community), rank, or social stature. In addition, in some embodiments, a user may initiate a request for network connectivity values for multiple target nodes in a single query. For example, node $n_1$ may wish to determine network connectivity values between it and multiple other nodes. For example, the multiple other nodes may represent several candidates for initiating a particular transaction with node $n_1$. By querying for all the network connectivity values in a single query, the computations may be distributed in a parallel fashion to multiple cores so that some or all of the results are computed substantially simultaneously.

In addition, queries may be initiated in a number of ways. For example, a user (represented by a source node) may identify another user (represented by a target node) in order to automatically initiate process 520. A user may identify the target node in any suitable way, for example, by selecting the target node from a visual display, graph, or tree, by inputting or selecting a username, handle, network address, email address, telephone number, geographic coordinates, or unique identifier associated with the target node, or by speaking a predetermined command (e.g., "query node 1" or "query node group 1, 5, 9" where 1, 5, and 9 represent unique node identifiers). After an identification of the target node or nodes is received, process 520 may be automatically executed. The results of the process (e.g., the individual or composite network connectivity values) may then be automatically sent to one or more third-party services or processes as described above.

In an embodiment, a user may utilize access application 102 to generate a user query that is sent to access application server 106 over communications network 104 (see also, FIG. 1) and automatically initiate process 520. For example, a user may access an Apple IOS, Android, or WebOS application or any suitable application for use in accessing application 106 over communications network 104. The application may display a searchable list of relationship data related to that user (e.g., "friend" or "follower" data) from one or more of Facebook, MySpace, openSocial, Friendster, Bebo, hi5, Orkut, PerfSpot, Yahoo! 360, LinkedIn, Twitter, Google Buzz, Really Simple Syndication readers or any other social networking website or information service. In some embodiments, a user may search for relationship data that is not readily listed—i.e., search Facebook, Twitter, or any suitable database of information for target nodes that are not displayed in the searchable list of relationship data. A user may select a target node as described above (e.g., select an item from a list of usernames representing a "friend" or "follower") to request a measure of how connected the user is to the target node. Using the processes described with respect to FIGS. 3 and 4A-D, this query may return an indication of how much the user may trust the target node. The returned indication may be displayed to the user using any suitable indicator. In some embodiments, indicator may be a percentage that indicates how trustworthy the target node is to the user.

In some embodiments, a user may utilize access application 102 to provide manual assignments of at least partially subjective indications of how trustworthy the target node is. For example, the user may specify that he or she trusts a selected target node (e.g., a selected "friend" or "follower") to a particular degree. The particular degree may be in the form of a percentage that represents the user's perception of how trustworthy the target node is. The user may provide this indication before, after, or during process 520 described above. The indication provided by the user (e.g., the at least partially subjective indications of trustworthiness) may then be automatically sent to one or more third-party services or processes as described above. In some embodiments, the indications provided by the user may cause a node and/or link to change in a network community. This change may cause a determination to be made that at least one node and/or link has changed in the network community, which in turn triggers various processes as described with respect to FIGS. 3 and 4A-4D.

In some embodiments, a path counting approach may be used in addition to or in place of the weighted link approach described above. Processing circuitry (e.g., of application server 106) may be configured to count the number of paths between a first node $n_1$ and a second node $n_2$ within a network community. A connectivity rating $R_{n1n2}$ may then be assigned to the nodes. The assigned connectivity rating may be proportional to the number of paths, or relationships, connecting the two nodes. A path with one or more intermediate nodes between the first node $n_1$ and the second node $n_2$ may be scaled by an appropriate number (e.g., the number of intermediate nodes) and this scaled number may be used to calculate the connectivity rating.

Each equation presented above should be construed as a class of equations of a similar kind, with the actual equation presented being one representative example of the class. For example, the equations presented above include all mathematically equivalent versions of those equations, reductions, simplifications, normalizations, and other equations of the same degree.

The above described embodiments of the invention are presented for purposes of illustration and not of limitation. The following numbered paragraphs give additional embodiments of the present invention.

What is claimed is:

1. A system for determining network connectivity between a first node and a second node, the system comprising:

a storage device for storage of data representing at least 10,000 nodes, a plurality of links between the at least 10,000 nodes, and information related to the links;

a communication device for receiving a request for determination of network connectivity between a first node and a second node of the at least 10,000 nodes;

processing circuitry configured to:

identify a plurality of paths from the first node to the second node within the at least 10,000 nodes, wherein each of the plurality of paths comprises at least two of a plurality of links to a plurality of nodes within the at least 10,000 nodes;

determine a normalized path weight for each identified path;

determine a set of qualified paths from the plurality of identified paths by comparing each path's normalized path weight to a path weight threshold value;

scale each of the qualified paths by a scaling number;

for each qualified path, determine a relative user weight; and produce a network connectivity indication using each qualified path's scaling number and relative user weight.

2. The system of claim 1, wherein determining the normalized path weight for each of the identified paths comprises:

for each path, multiplying the weights of all the links within that path.

3. The system of claim 1, wherein the system is further configured to:

transmit the network connectivity information to a user's computer.

4. The system of claim 3, wherein the system is further configured to:

transmit information for causing the user's computer to display an indication of the network connectivity information.

5. The system of claim 1, wherein the system is further configured to:

receive assignments, by a user associated with the first node, a user connectivity value for each of a plurality of outgoing links from the first node.

6. The system of claim 5, wherein the system is further configured to:

determine a partially subjective network connectivity indication using the user assigned connectivity values.

7. The system of claim 6, wherein the system is further configured to:

determine a composite network connectivity indication using a combination of the partially subjective network connectivity indication and the network connectivity indication.

8. A method for determining network connectivity between a first node and a second node, the method comprising:

identifying, using computer processing circuitry, a plurality of paths to the second node from the first node within a network community of at least 10,000 nodes, wherein each path comprises two or more links to a plurality of nodes within the at least 10,000 nodes, and wherein each link has a user connectivity value;

determining, using the computer processing circuitry, a normalized path weight for each of the identified paths;

determining, using the computer processing circuitry, a set of qualified paths from the plurality of identified paths by comparing each path's normalized path weight to a path weight threshold value;

scaling, using the computer processing circuitry, each of the qualified paths by a scaling number;

for each of the qualified paths, using the computer processing circuitry to determine a relative user weight; and producing, using the computer processing circuitry, a network connectivity indication using each qualified path's scaling number and relative user weight.

9. The method of claim 8, wherein determining the normalized path weight for each of the identified paths comprises:

for each path, multiplying the weights of all the links within that path.

10. The method of claim 8, further comprising transmitting the network connectivity information to a user's computer.

11. The method of claim 10, further comprising causing the user's computer to display an indication of the network connectivity information.

12. The method of claim 8, further comprising assigning, by a user associated with the first node, a user connectivity value to each of a plurality of outgoing links from the first node.

13. The method of claim 12, further comprising determining a partially subjective network connectivity indication using the user assigned connectivity values.

14. The method of claim 13, further comprising determining a composite network connectivity indication using a combination of the partially subjective network connectivity indication and the network connectivity indication.

15. A non-transitory computer readable medium comprising instructions encoded thereon for providing media guidance for determining network connectivity between a first node and a second node, the instructions comprising instructions for causing computer processing circuitry to perform the steps of:

identifying a plurality of paths to the second node from the first node within a network community of at least 10,000 nodes, wherein each path comprises two or more links, and wherein each link has a user connectivity value;

determining a normalized path weight for each of the identified paths;

determining a set of qualified paths from the plurality of identified paths by comparing each path's normalized path weight to a path weight threshold value;

scaling each of the qualified paths by a scaling number;

for each of the qualified paths, determining a relative user weight; and producing a network connectivity indication using each qualified path's scaling number and relative user weight.

16. The medium of claim 15, wherein determining the normalized path weight for each of the identified paths comprises:

for each path, multiplying the weights of all the links within that path.

17. The medium of claim 15, further comprising instructions for transmitting the network connectivity information to a user's computer.

18. The medium of claim 17, further comprising instructions for causing the user's computer to display an indication of the network connectivity information.

19. The medium of claim 15, further comprising instructions for:

accepting assignments, by a user associated with the first node, a user connectivity value for each of a plurality of outgoing links from the first node; and determining a partially subjective network connectivity indication using the user assigned connectivity values.

20. The medium of claim 19, further comprising instructions for:

determining a composite network connectivity indication using a combination of the partially subjective network connectivity indication and the network connectivity indication.

* * * * *